US007692804B2

(12) United States Patent
Naito et al.

(10) Patent No.: US 7,692,804 B2
(45) Date of Patent: Apr. 6, 2010

(54) IMAGE FORMING APPARATUS, CARTRIDGE, AND STORING DEVICE MOUNTED TO THE CARTRIDGE

(75) Inventors: Norihito Naito, Numazu (JP); Yasunao Otomo, Mishima (JP); Hideaki Hasegawa, Susono (JP); Nobuo Oshima, Shizuoka-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 1174 days.

(21) Appl. No.: 10/528,341

(22) PCT Filed: May 14, 2004

(86) PCT No.: PCT/JP2004/006917

§ 371 (c)(1),
(2), (4) Date: Nov. 18, 2005

(87) PCT Pub. No.: WO2004/102282

PCT Pub. Date: Nov. 25, 2004

(65) Prior Publication Data

US 2006/0181726 A1 Aug. 17, 2006

(30) Foreign Application Priority Data

May 14, 2003 (JP) ............................ 2003-135765

(51) Int. Cl.
*G06F 3/12* (2006.01)

(52) U.S. Cl. .......................... 358/1.13; 399/26; 399/27; 399/51; 399/53; 399/55; 399/58

(58) Field of Classification Search ................ 358/1.13; 399/26–27, 51, 53, 55, 58
See application file for complete search history.

(56) References Cited

U.S. PATENT DOCUMENTS 5,583,621 A 12/1996 Narukawa .................. 355/246

(Continued)

FOREIGN PATENT DOCUMENTS

JP 1-133075 A 5/1989

(Continued)

OTHER PUBLICATIONS

English translation of Dec. 13, 2007 Office Action for corresponding Vietnamese Application No. 1-2005-01832.

(Continued)

*Primary Examiner*—David M Gray
*Assistant Examiner*—Geoffrey T Evans
(74) *Attorney, Agent, or Firm*—Fitzpatrick, Cella, Harper & Scinto

(57) ABSTRACT

An image forming apparatus operates in a first image formation mode for forming an image on an image bearing member by using developer under a first predetermined image forming condition and a second image formation mode for forming an image on an image bearing member by using developer under a second image forming condition which is different from the first predetermined image forming condition. The apparatus is set so that the amount of consumption of developer for forming an image in the second image formation mode is smaller than the amount of consumption used for forming an identical image in the first image formation mode. The apparatus includes a storing device for storing information for setting the second image forming condition corresponding to a plurality of levels of the amount of usage of the image bearing member, and a controller for changing the second image forming condition in the second image formation mode depending on the amount of usage of the image bearing member and information stored in the storing device.

17 Claims, 32 Drawing Sheets

U.S. PATENT DOCUMENTS

| | | | | |
|---|---|---|---|---|
| 5,960,232 | A | 9/1999 | Cheng | 399/55 |
| 6,266,153 | B1 | 7/2001 | Davidson et al. | 358/1.9 |
| 6,324,356 | B1 | 11/2001 | Inoue | 399/39 |
| 6,349,184 | B2 | 2/2002 | Otomo | 399/27 |
| 6,615,001 | B2 | 9/2003 | Otomo et al. | 399/27 |
| 6,621,989 | B2 | 9/2003 | Otomo et al. | 399/27 |
| 6,661,980 | B2 | 12/2003 | Matsumoto et al. | 399/27 |
| 6,785,479 | B2 | 8/2004 | Naito et al. | 399/27 |
| 6,791,714 | B1 * | 9/2004 | Ishimura | 358/1.9 |
| 7,274,884 | B2 * | 9/2007 | Yamauchi | 399/25 |
| 2001/0013939 | A1 | 8/2001 | Weaver et al. | 358/1.9 |
| 2002/0071689 | A1 * | 6/2002 | Miyamoto | 399/53 |
| 2003/0165344 | A1 | 9/2003 | Ohtomo et al. | 399/27 |
| 2004/0131393 | A1 | 7/2004 | Otomo et al. | 399/274 |

FOREIGN PATENT DOCUMENTS

| | | |
|---|---|---|
| JP | 8-54806 | 2/1996 |
| JP | 9-85993 A | 3/1997 |
| RU | 2 029 329 C1 | 2/1995 |

OTHER PUBLICATIONS

Russian Office Action of Appln. No. 2005138848/28(043348) and English translation thereof.

Russian Office Action, mailed Jun. 9, 2007, of Appln. No. 2005138848/28(043348) and English translation thereof.

Russian Office Action, dated Aug. 28, 2007, of Appln. No. 2005138848/28(043348) and English translation thereof.

Office Action for corresponding Indian Application No. 2986/CHENP/2005 dated Jul. 6, 2007.

Oct. 9, 2006 Korean Office Action.

* cited by examiner (a)

(b)

(c)

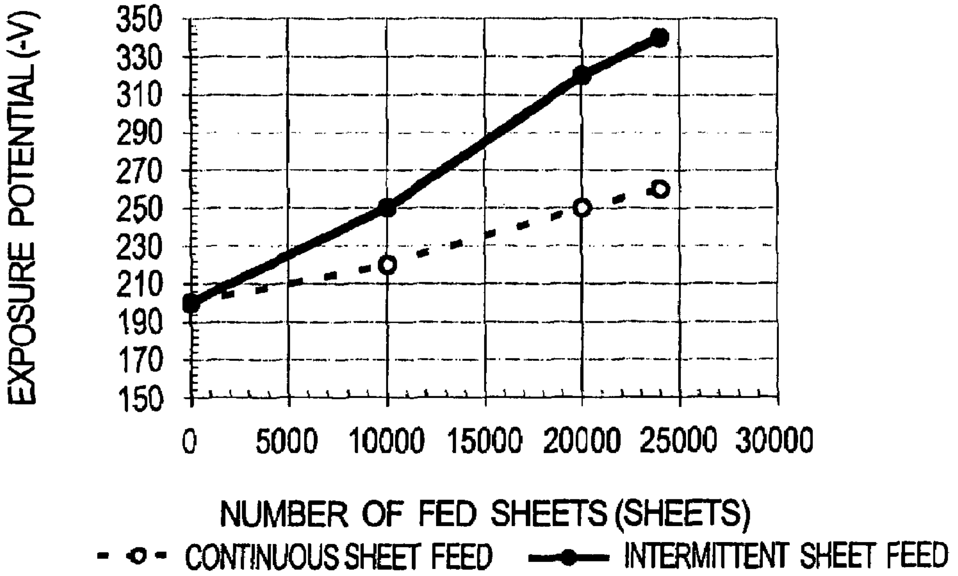
FIG. 13
| | APPLICATION TIME | | | | CONTINUOUS FEED | INTERMIT-TENT FEED |
|---|---|---|---|---|---|---|
| | PRE-ROTATION | SHEET FEED | POST-ROTATION | SHEET INTERVAL | | |
| Pt | 2.0 | 1.7 | 2.0 | 1.0 | 2.7 | 5.7 |
| Dt | 2.5 | 1.7 | 2.5 | 1.0 | 2.7 | 6.7 |
(sec)
FIG. 14
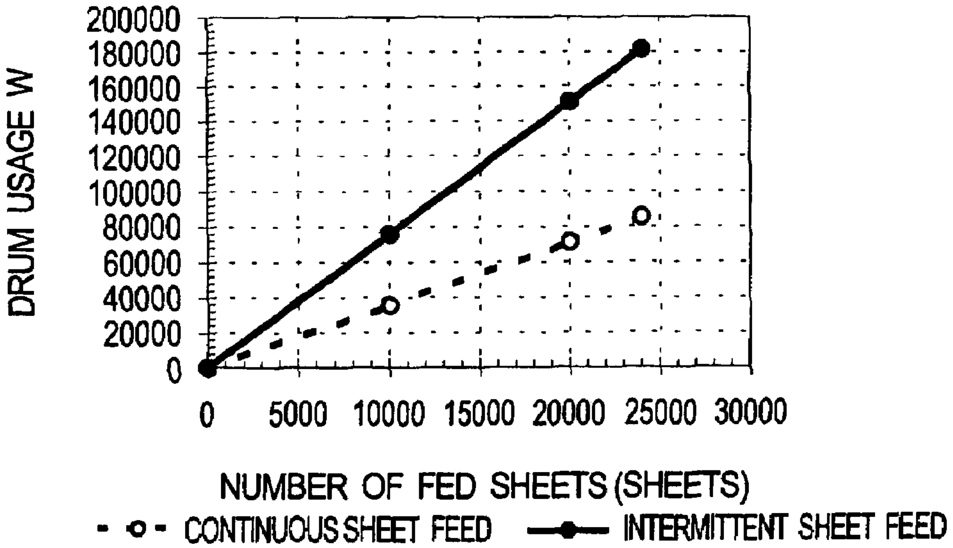
FIG. 15

| DRUM USAGE | SMALL PIXEL | LARGE PIXEL |
|---|---|---|
| 0 | 80% | 60% |
| 37750 | 83% | 65% |
| 75500 | 85% | 70% |
| 113250 | 88% | 75% |
| 151000 | 90% | 80% |
| 181200 | 92% | 85% |

FIG. 16

| PROCESS CONDITON | DRUM USAGE | SMALL PIXEL | LARGE PIXEL |
|---|---|---|---|
| 0 | 0 | 80% | 60% |
| 1 | 37750 | 83% | 65% |
| 2 | 75500 | 85% | 70% |
| 3 | 113250 | 88% | 75% |
| 4 | 151000 | 90% | 80% |
| 5 | 181200 | 92% | 85% |

FIG. 17

| ID NO. | PROCESSING CONDITION | LINE IMAGE | SOLID BLACK IMAGE |
|---|---|---|---|
| 1 | PROCESSING CONDITION 1 | 75% | 50% |
| 2 | PROCESSING CONDITION 2 | 77% | 55% |
| 3 | PROCESSING CONDITION 3 | 80% | 60% |
| 4 | PROCESSING CONDITION 4 | 83% | 65% |
| 5 | PROCESSING CONDITION 5 | 85% | 70% |
| 6 | PROCESSING CONDITION 6 | 88% | 75% |
| 7 | PROCESSING CONDITION 7 | 90% | 80% |
| 8 | PROCESSING CONDITION 8 | 93% | 85% |
| 9 | PROCESSING CONDITION 9 | 95% | 90% |

(a)

(b)

(a)

| USAGE | LINE IMAGE | SOLID BLACK IMAGE |
|---|---|---|
| 0 | 75% | 50% |
| 37750 | 77% | 55% |
| 75500 | 80% | 60% |
| 113250 | 83% | 65% |
| 151000 | 85% | 70% |
| 181200 | - | - |

(b)

| USAGE | LINE IMAGE | SOLID BLACK IMAGE |
|---|---|---|
| 0 | 85% | 70% |
| 37750 | 88% | 75% |
| 75500 | 90% | 80% |
| 113250 | 93% | 85% |
| 151000 | 95% | 90% |
| 181200 | - | - |

FIG.34

(a)

| TH INFO | | ID INFO |
|---|---|---|
| 0 | - | 1 |
| 37750 | - | 2 |
| 75500 | - | 3 |
| 113250 | - | 4 |
| 151000 | - | 5 |

(b)

| TH INFO | | ID INFO |
|---|---|---|
| 0 | - | 5 |
| 37750 | - | 6 |
| 75500 | - | 7 |
| 113250 | - | 8 |
| 151000 | - | 9 |

FIG.35

IMAGE FORMING APPARATUS, CARTRIDGE, AND STORING DEVICE MOUNTED TO THE CARTRIDGE

TECHNICAL FIELD

The present invention relates to an image forming apparatus, particularly an image forming apparatus of the electrophotography type, such as a laser beam printer or the like. The present invention also relates to a cartridge, and a storing device to be mounted to the cartridge.

BACKGROUND ART

A description is provided with reference to an electrophotographic image forming apparatus, such as a laser beam printer shown in FIG. 2.

Referring to FIG. 2, the electrophotographic image forming apparatus forms an electrostatic latent image by irradiating an electrophotographic image bearing member 1, uniformly charged by a charging means 2, with light corresponding to image information, and makes visible the electrostatic latent image as an image by supplying developer (hereinafter, referred to as "toner") as a recording material by the use of a developing means. Further, the toner image is transferred from the image bearing member 1 onto a recording paper P as a recording medium, and the recording paper P holding the toner is sent to a fixing device 18 so as not to disturb the toner image, which image is then subjected to fixation under heat and pressure by the fixing device 18 to be recorded and outputted as a permanent image on the recording paper P. To the developing means, a toner container as a developer containing portion 4 containing the toner is connected. The toner is consumed by forming the image. In many cases, the toner container, the developing means, the image bearing member, the charging means and so on, are integrally constituted as a process cartridge (hereinafter, referred to as a "cartridge"). When the toner is consumed, a user can form again an image by replacing the cartridge with a new one.

In the cartridge, a predetermined amount of toner determined by a container volume is contained. Accordingly, the number of printable sheets by the user generally correlates with the amount of toner. Users who save toner by reducing toner consumption to permit a larger number of printable sheets are increasing. In addition, laser beam printers having an image formation mode, such as a low (toner) consumption mode or a draft mode, capable of automatically decreasing the amount of toner consumption are also increasing.

As a means for decreasing the toner consumption amount, it is possible to use a means for changing a developing contrast, a means for changing a laser light quantity, etc. By changing the developing contrast or the laser light source, a latent image formed on the image bearing member is changed. As a result, toner coverage can be reduced at the time of development.

However, in the case where the amount of toner consumption is decreased only by the developing contrast or the laser light quantity, a thin line image or a character image has a very narrow line width to provide a poor image quality in some cases even under such a condition that a change in image quality is less conspicuous with respect to a solid black image having a large area to some extent.

For this reason, as a means for reducing the toner consumption amount while ensuring an adequate line width, a control method has been developed to print an image frame portion constituted by a binary image at an original density but the amount of toner consumption is decreased at an inner portion of the image, to permit a decrease in the toner consumption amount while ensuring an adequate line width (e.g., Japanese Laid-Open Patent Application No. Hei 9-085993). More specifically, as shown in FIG. 3, the control method effects such an image processing that an original image (image data) 301 to be printed is changed into a dither image 302, wherein a frame portion, as a concentrated pixel area like a solid black image, is printed at an original density, but an inner portion is provided with distributed blank dots which are not printed or a halftone image 303, wherein the amount of emission of a laser or a laser-on period is changed on a one dot unit basis.

Herein, such an image formation mode for suppressing a toner coverage by modulating an image is referred to as a "low (toner) consumption mode".

However, the above-described conventional image control means is accompanied with the following problems.

In the low consumption mode image control means which has been conventionally used, as described above, a frame portion of a concentrated pixel portion of a resultant image is printed at an original density and the image is converted into a dither image and a halftone image at an inner portion (central portion) to reduce the amount of toner consumption. In this case, the image control means is uniformly adapted to all the images except for those at the frame portion. The proportion between a pattern of the dither image and a pattern of the halftone image is switched according to the use circumstances, whereby it becomes possible to provide a low consumption mode which maintains image quality.

However, in the case of effecting a low consumption mode with the dither image, when the amount of toner consumption is intended to be further decreased compared with that in the conventional low consumption mode, there arises such a problem that a blank dot portion is very conspicuous to make an image, to be originally a solid black image, a mesh image.

Further, in recent laser beam printers, the number of available sheets for a toner cartridge is increased with its popularization, so that a further increase in life and the number of available sheets has been practiced. However, the long life of the toner cartridge leads to a difference in density or line width of a solid black image between a toner cartridge in an initial state and a toner cartridge which has been subjected to printing (copying) of a very large number of sheets. As a result, the resultant image quality deteriorates in some cases. Particularly, this phenomenon is more noticeable in the case where a material which is readily abraded in continuous image formation is used in a photosensitive layer of the image bearing member (or in the case where a material having a different sensitivity characteristic of the image bearing member is used).

Further, in the case of effecting a low consumption mode with the halftone image obtained by changing an emission time or an emission light quantity of a laser scanner, there arises such a problem that the low consumption mode is more liable to be affected by a durability change of a photosensitive layer of the image bearing member. More specifically, with respect to an ordinary laser light in the case where the halftone treatment is not performed, there is substantially no influence by a sensitivity change due to abrasion of the photosensitive layer caused by long-term use of the image bearing member. However, with respect to a laser light changed in emission time or emission light quantity, the sensitivity of the image bearing member becomes lower as the photosensitive layer becomes thinner by a durability deterioration of the photosensitive layer, i.e., abrasion of the image bearing member. As a result, a large density lowering and a deterioration in line width are caused to occur.

Further, it is possible to mount a density sensor for detecting a sensitivity change of the image bearing member or an exposure potential sensor for the image bearing member but the mounting of the sensors is accompanied by the problem of cost for incorporating detection circuits for the above-described sensors and the problem of ensuring mounting space for mounting the sensors.

In addition, in the above-described pattern difference in the area of the image, such as the solid black image or line width, as in the conventional image control means, the amount of toner consumption required to maintain the quality of an image area limits the decrease in the toner consumption amount, so that it is necessary to sacrifice a decreased degree of the toner consumption amount if the toner consumption amount decreasing means uniformly decreases the amount of toner consumption irrespective of image area.

Further, with diversification of cartridges, a cartridge which can be detachably mountable to the identical image forming apparatus but has a different toner volume, has been put into practical use. For example, a cartridge that achieves a low price by reducing toner volume, has been commercialized. An image bearing member (photosensitive member) in such a cartridge having a different toner volume is designed to have a thickness adapted for respective toner volumes so as to reduce costs in some cases. For this reason, in the case where the toner consumption amount is decreased by using the low toner consumption mode, an appropriate initial drum thickness is different depending on the respective cartridges. As a result, there arises such a problem that the progression of durability of drum use or a difference in image quality becomes large.

DESCRIPTION OF THE INVENTION

In order to solve the above-described problems, an object of the present invention is to provide an image forming apparatus and a cartridge which are capable of reducing an amount of usage of developer while retaining stable image qualities irrespective of the amount of usage of an image bearing member.

Another object of the present invention is to provide a storing device to be mounted to a cartridge.

According to the present invention, there is provided an image forming apparatus operating in a first image formation mode for forming an image on an image bearing member by using developer under a first predetermined image forming condition and a second image formation mode for forming an image on an image bearing member by using developer under a second image forming condition which is different from the first predetermined image forming condition. The apparatus is set so that the amount of consumption of developer for forming an image in the second image formation mode is smaller than the amount of developer used for forming an identical image in the first image formation mode. The apparatus comprises:

a storing device that stores information for setting the second image forming condition corresponding to a plurality of levels of an amount of usage of the image bearing member, and a controller that changes the second image forming condition in the second image formation mode depending on an amount of usage of the image bearing member and information stored in the storing device.

According to the present invention, there is also provided a cartridge for being detachably mountable to an image forming apparatus operating in a first image formation mode for forming an image on an image bearing member by using developer under a first predetermined image forming condition and a second image formation mode for forming an image on an image bearing member by using developer under a second image forming condition which is different from the first predetermined image forming condition. The cartridge d is set so that an amount of consumption of developer for forming an image in the second image formation mode is smaller than the amount of developer used for forming an identical image in the first image formation mode. The cartridge comprises:

the image bearing member, and a storing device that stores information on the cartridge, the storing device having a first storing area for storing information for setting the second image forming condition corresponding to a plurality of levels of an amount of usage of the image bearing member in the second image formation mode.

According to the present invention, there is further provided a storing device to be mounted to a cartridge for being detachably mountable to an image forming apparatus including an image bearing member and operating in a first image formation mode for forming an image on an image bearing member by using developer under a first predetermined image forming condition and a second image formation mode for forming an image on an image bearing member by using developer under a second image forming condition which is different from the first predetermined image forming condition. The apparatus is set so that the amount of consumption of developer for an image formed in the second image formation mode is smaller than the amount of developer used for forming an identical image in the first image formation mode. The storing device has:

a first storing area for storing information for setting the second image forming condition corresponding to a plurality of levels of the amount of usage of the image bearing member in the second image formation mode.

According to the present invention, there is further provides a storing device to be mounted to a cartridge for being detachably mountable to an image forming apparatus including an image bearing member and operating in a first image formation mode for forming an image on an image bearing member by using developer under a first predetermined image forming condition and a second image formation mode for forming an image on an image bearing member by using developer under a second image forming condition which is different from the first predetermined image forming condition. The apparatus is set so that the amount of consumption of developer for forming an image in the second image formation mode is smaller than the amount of developer used for forming an identical image in the first image formation mode. The storing device has:

a first storing area for storing information for setting the second image forming condition corresponding to an amount of usage of the image bearing member. The information for setting the second image forming condition corresponding to the amount of usage of the image bearing member is information which is used in the second image formation mode but is not used in the first image formation mode.

These and other objects, features and advantages of the present invention will become more apparent upon a consideration of the following description of the preferred embodiments of the present invention taken in conjunction with the accompanying drawings.

BRIEF DESCRIPTION OF THE INVENTION

Figure 8:
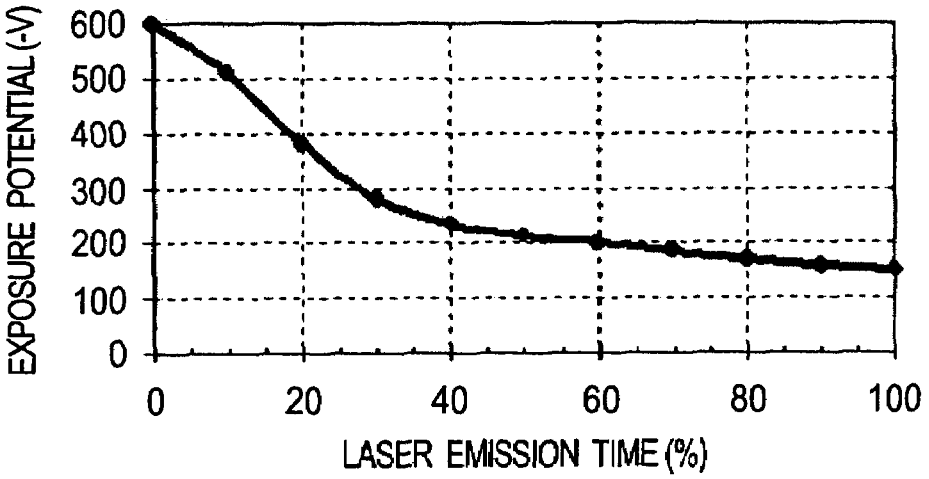
Figure 8:
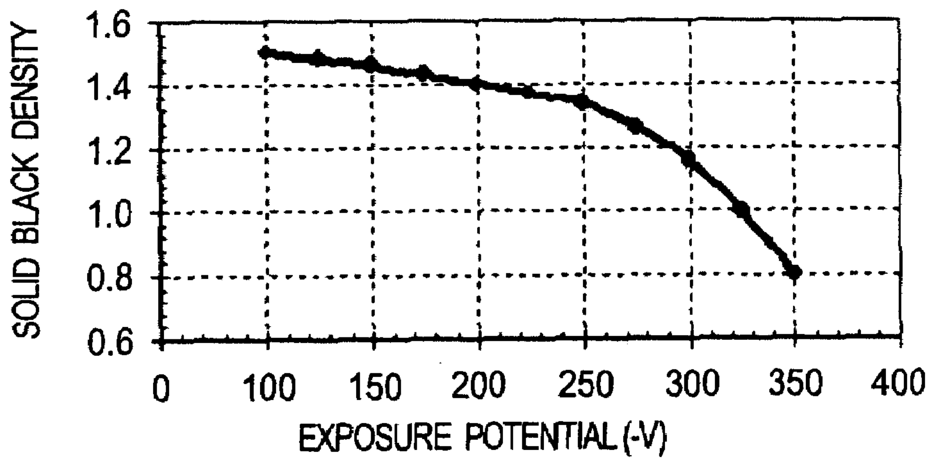
Figure 8:
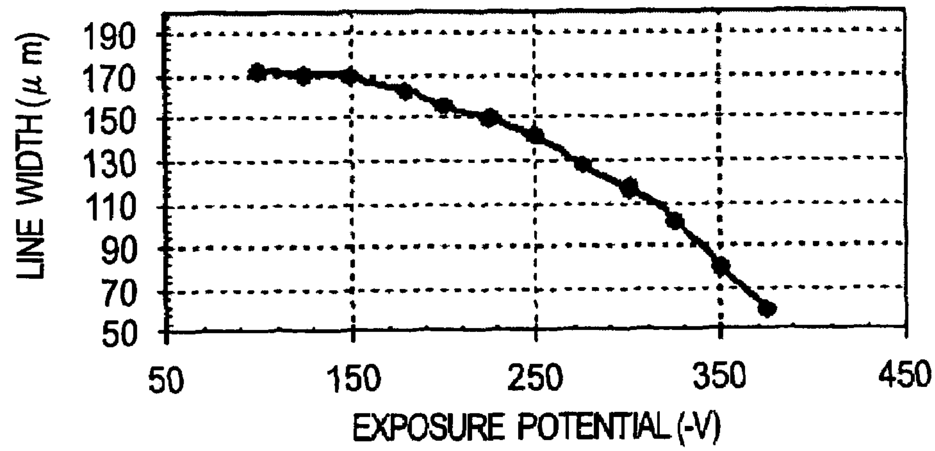

FIGS. 8(*a*), 8(*b*) and 8(*c*) are graphs showing the relationships between a modulation degree of a laser-on period and an exposure potential on an image bearing member, between the exposure potential and a solid black density, and between the exposure potential and a line width, respectively, in Embodiment 1.

Figure 9:
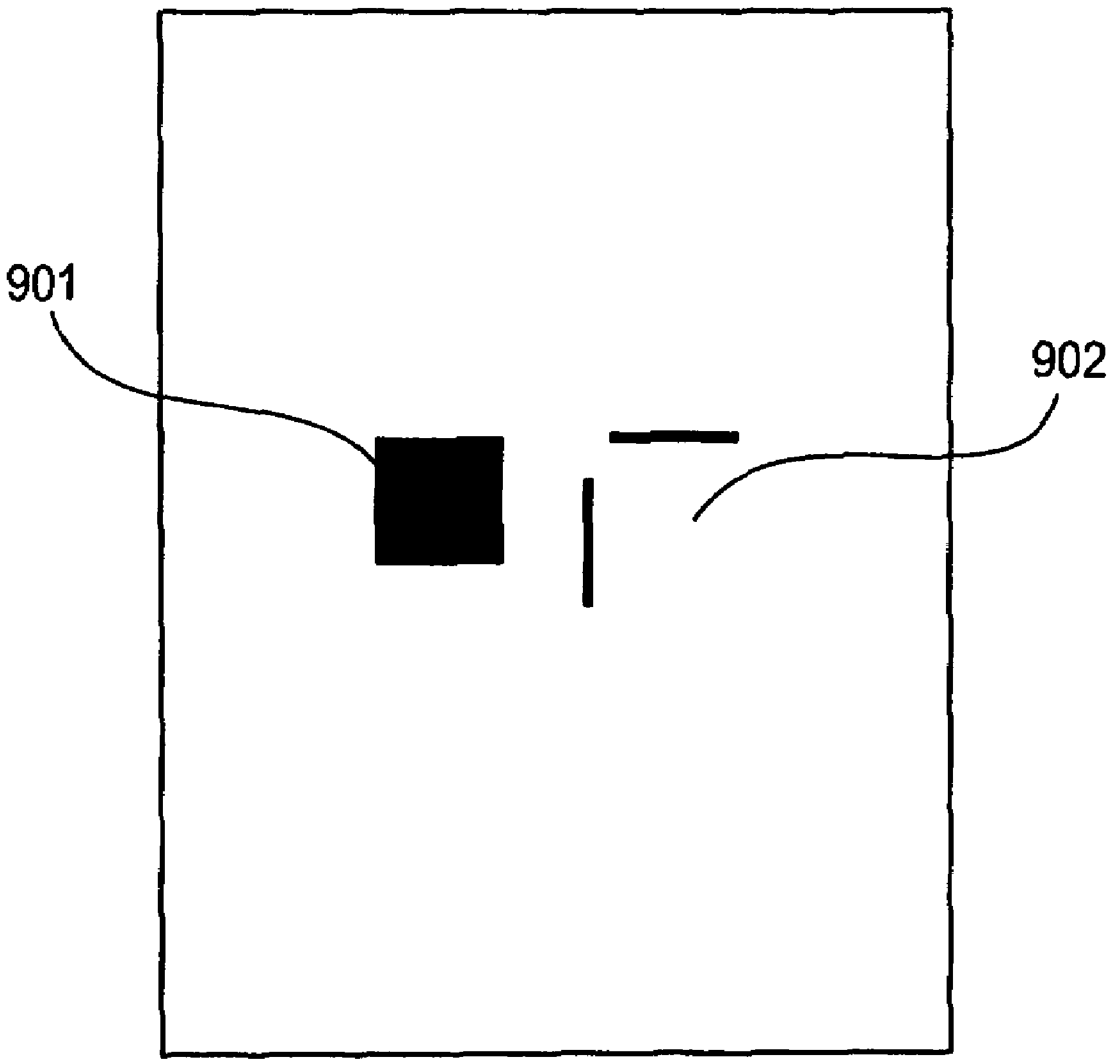

FIG. 9 is a schematic explanatory view for illustrating a measurement sample for measuring the solid black density and a line width in Embodiment 1.

Figure 10:
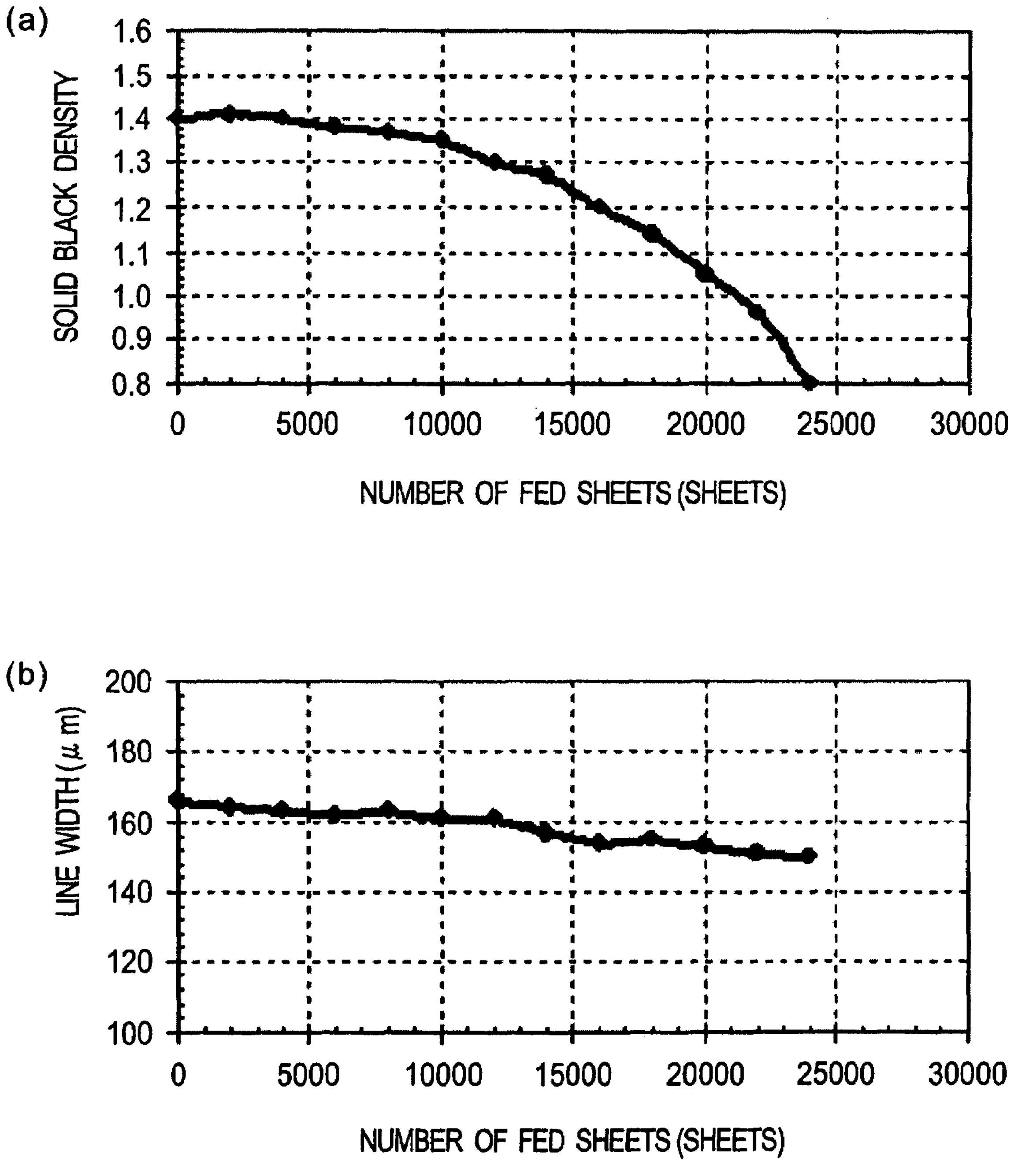

FIGS. 10(*a*) and 10(*b*) are graphs showing the relationships between the number of fed sheets and the solid black image, and between the number of fed sheets and the line width, respectively, in Embodiment 1.

Figure 11:
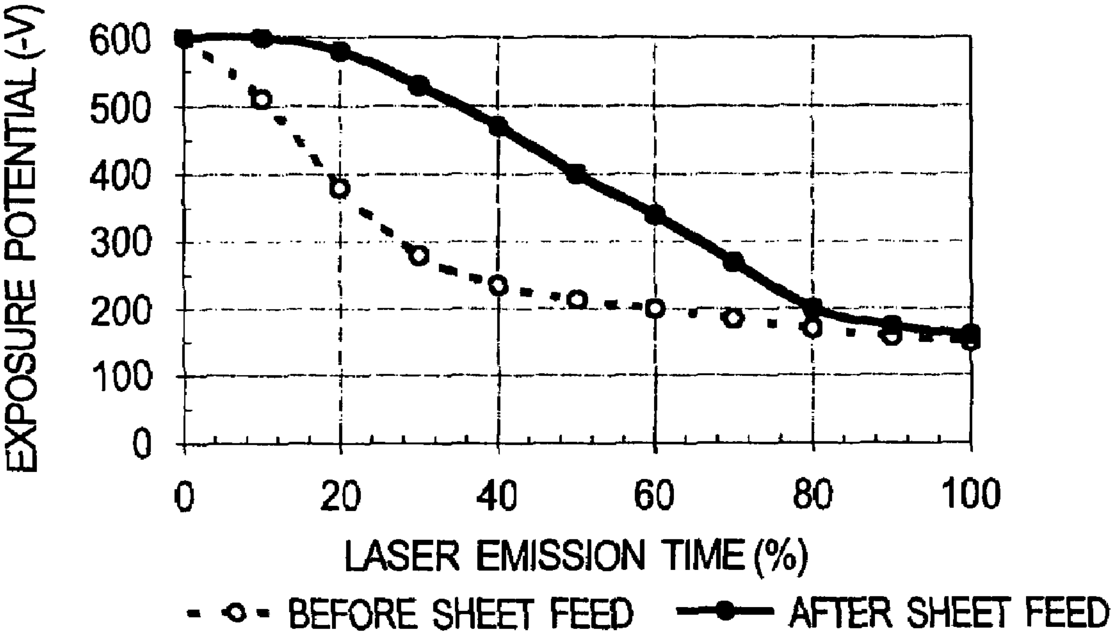

FIG. 11 is a graph showing a relationship between the modulation degree of a laser-on period and the exposure potential on the image bearing member before and after sheet feeding in Embodiment 1.

Figure 12:
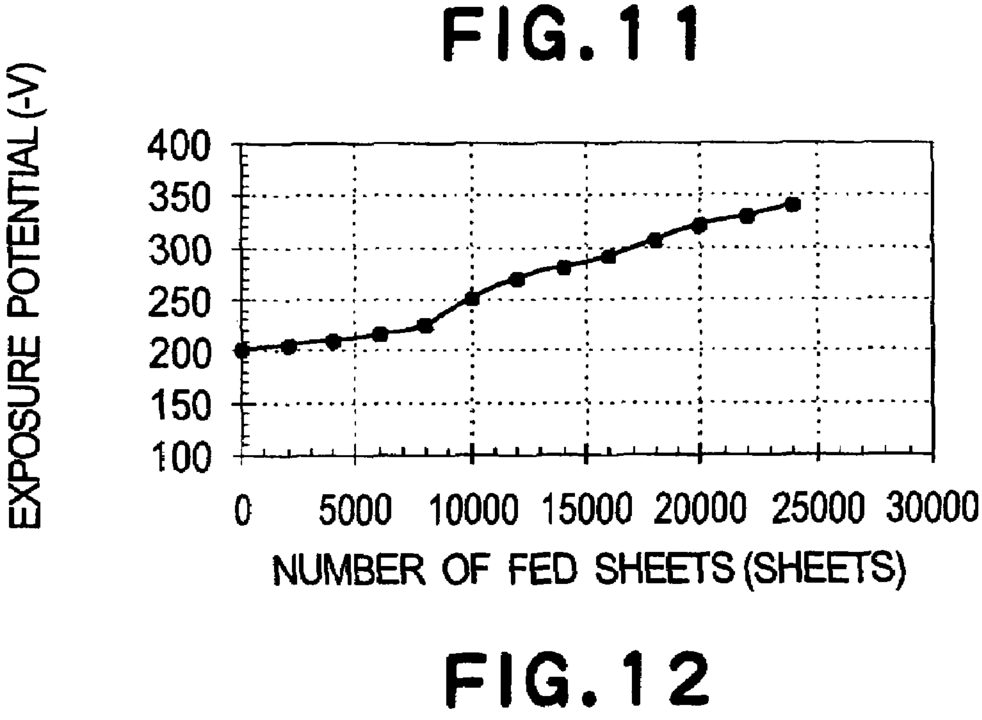

FIG. 12 is a graph showing a relationship between the number of fed sheets and the exposure potential on the image bearing member in Embodiment 1.

FIG. 13 is a graph showing a relationship between the number of fed sheets and the exposure potential on the image bearing member under different sheet feeding conditions in Embodiment 1.

FIG. 14 is a table showing a charging bias voltage application time and rotation time of the image bearing member in Embodiment 1.

FIG. 15 is a graph showing a relationship between the number of fed sheets and an amount of usage of image bearing member (an amount of drum usage) in Embodiment 1.

FIG. 16 is a table showing the amount of drum usage and an appropriate modulation degree of laser on-period in Embodiment 1.

FIG. 17 is a table showing a threshold value and the modulation degree a laser-on period under various image processing conditions in Embodiment 1.

Figure 18:
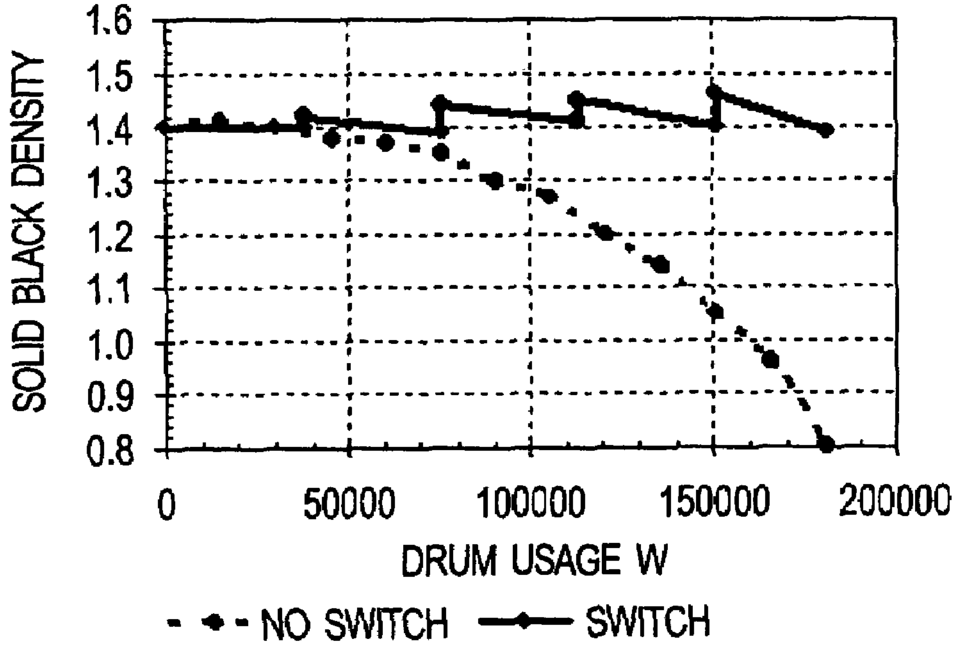
Figure 18:
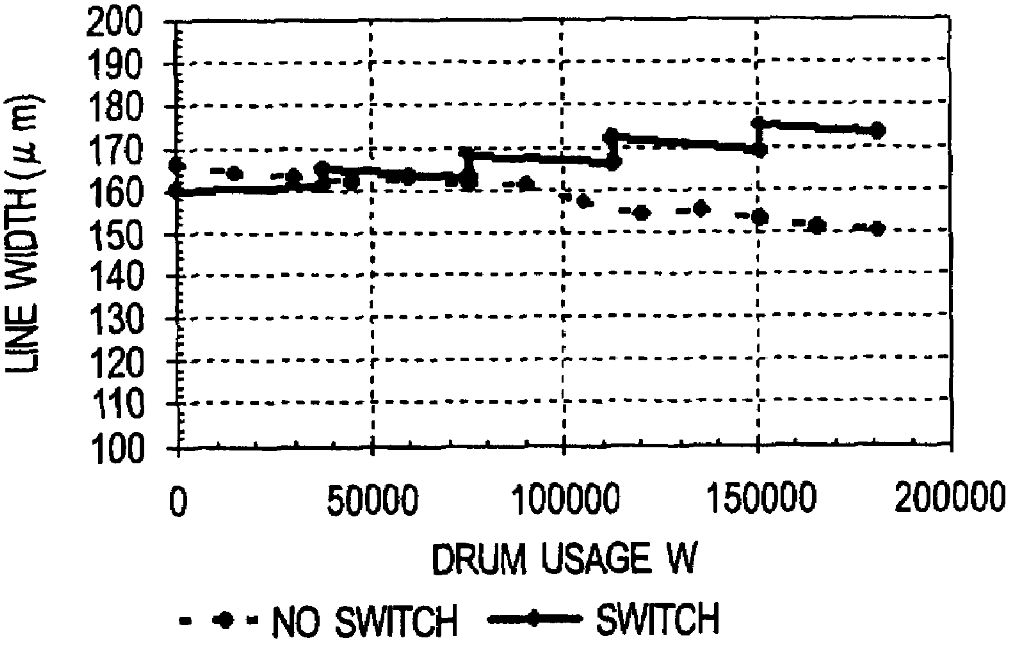

FIGS. 18(*a*) and 18(*b*) are graphs each showing a switching effect of the modulation degree of a laser-on period in Embodiment 1.

Figure 19A:
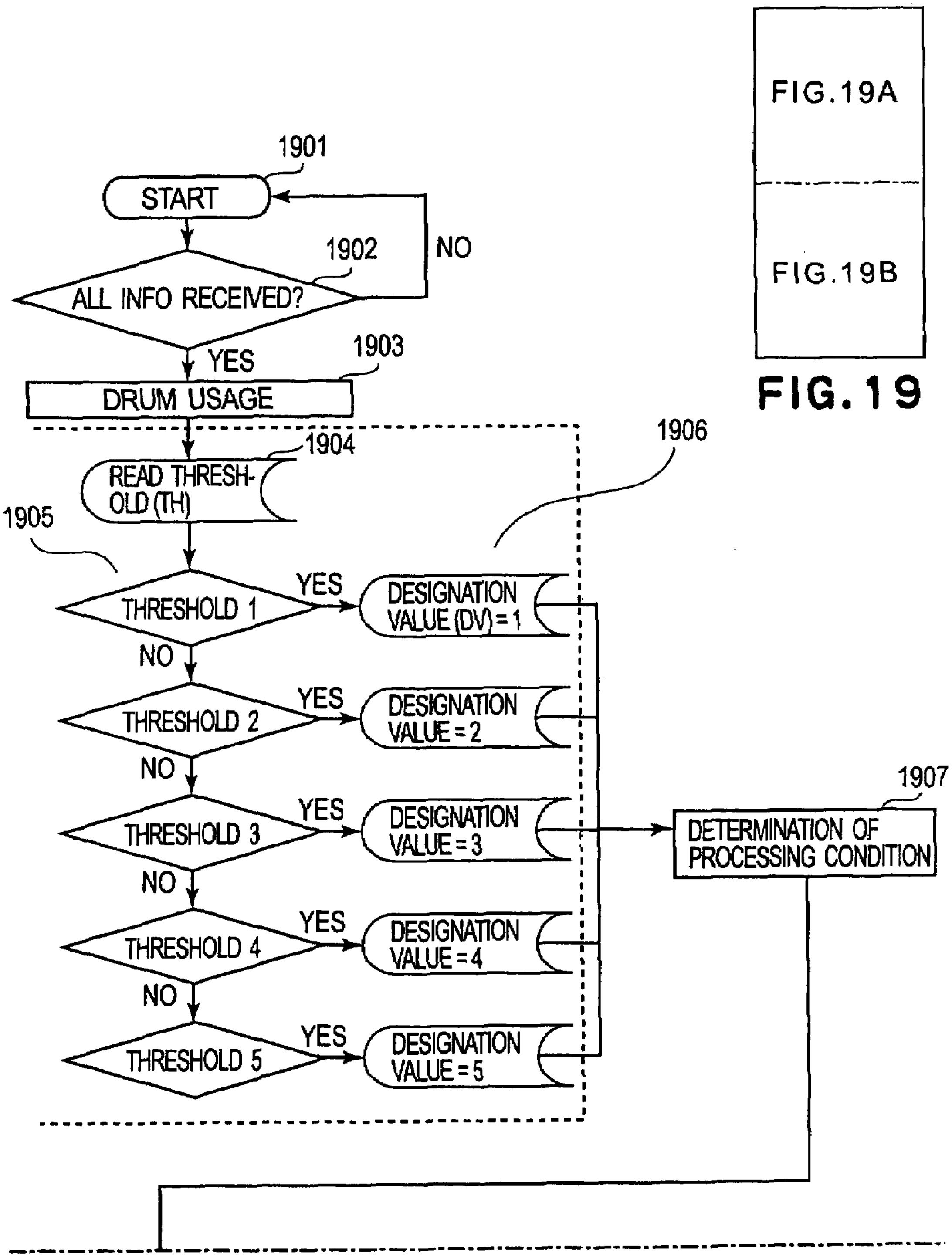
Figure 19B:
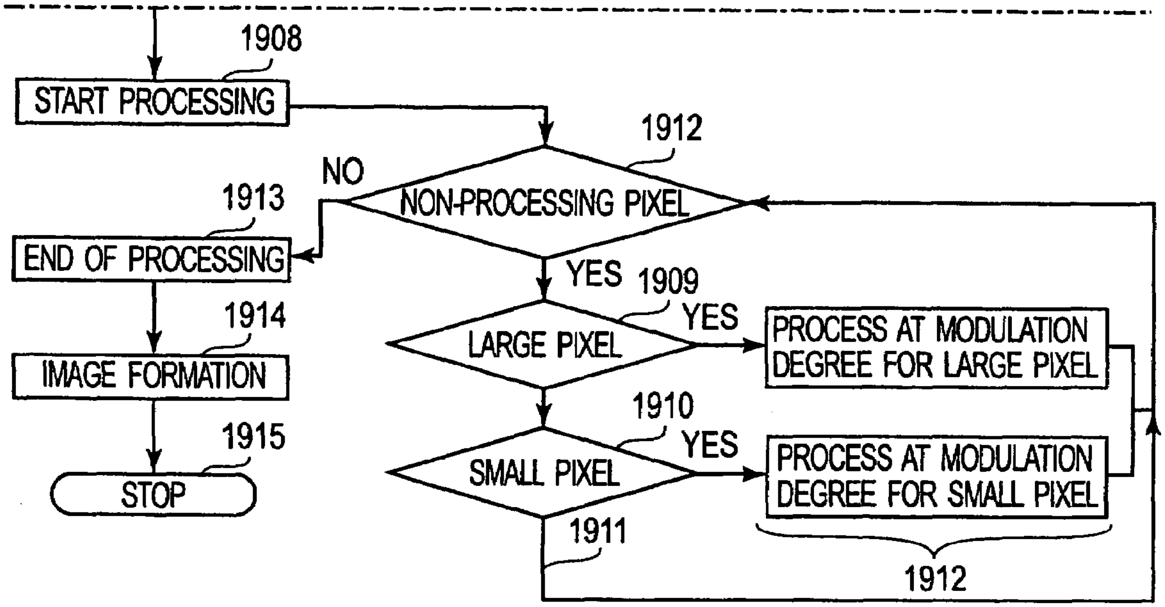

FIG. 19 is a schematic block diagram showing the relationship between FIGS. 19A and 19B, FIG. 19A is a portion of a flow chart regarding control in Embodiment 1, and FIG. 19B is the other portion of the flow chart regarding control in Embodiment 1.

Figures 20, 21:
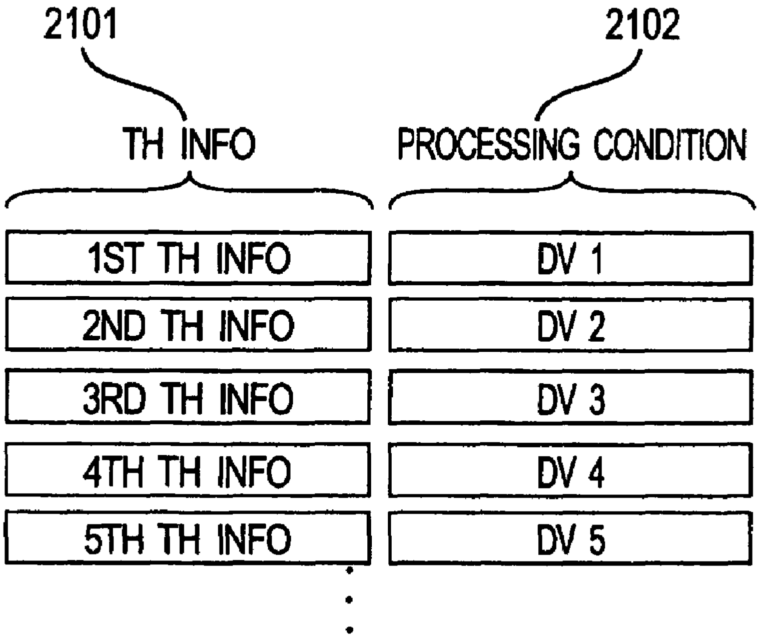

FIG. 20 is a table showing the modulation degree of a laser-on period in each of image formation modes in Embodiment 1.

Figure 22:
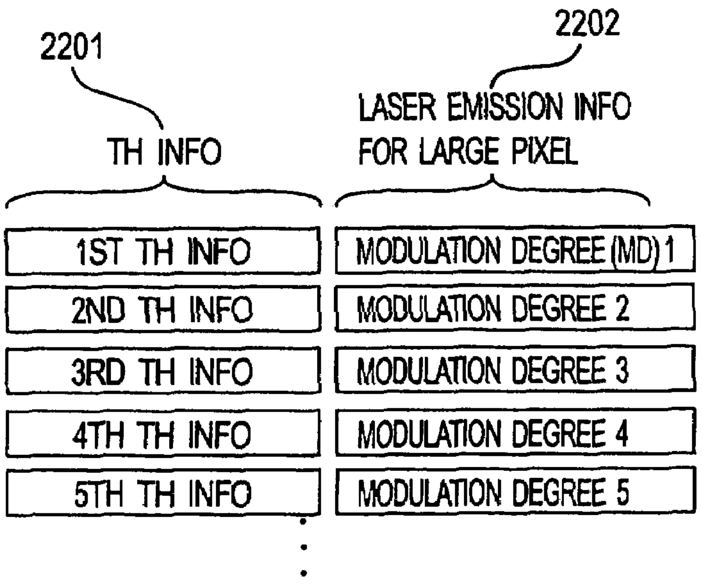

FIGS. 21 and 22 are schematic view showing switching threshold information stored in a storing device and the switching identification number storing mode in Embodiment 1 and Embodiment 2, respectively.

Figure 23:
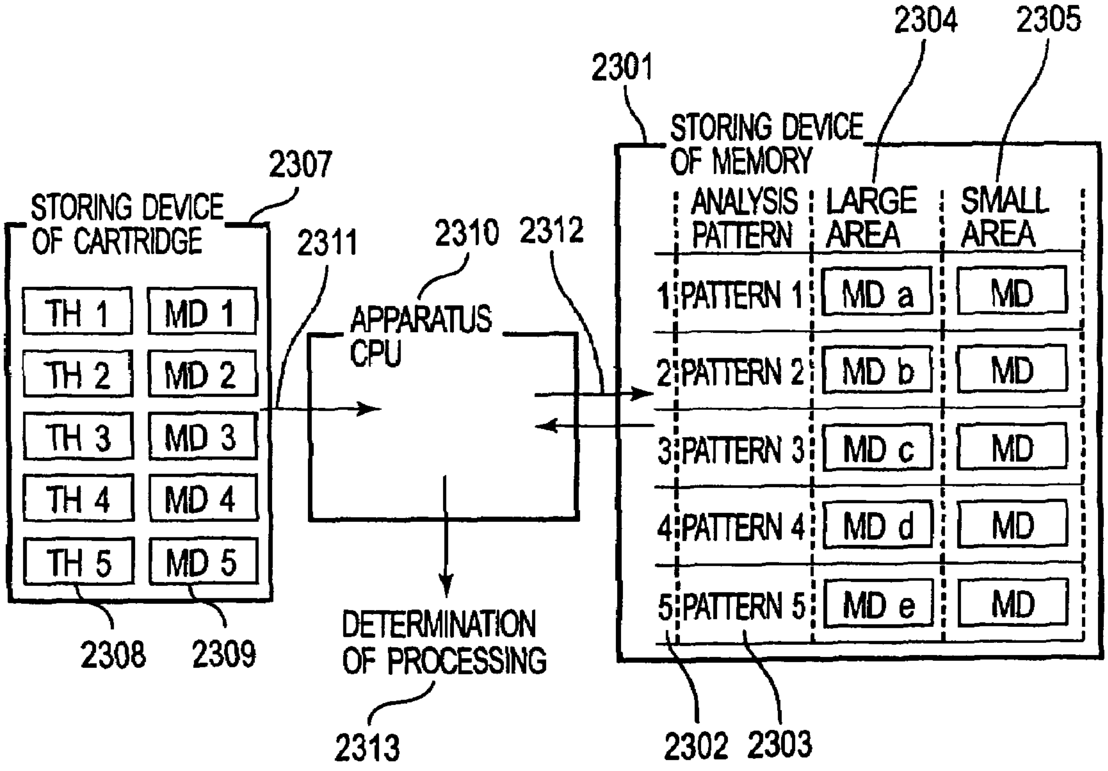

FIG. 23 is a schematic views showing a relationship between a storing device of cartridge, a CPU of apparatus main assembly, and a storing device of apparatus main assembly in Embodiment 2.

Figures 24, 24A:
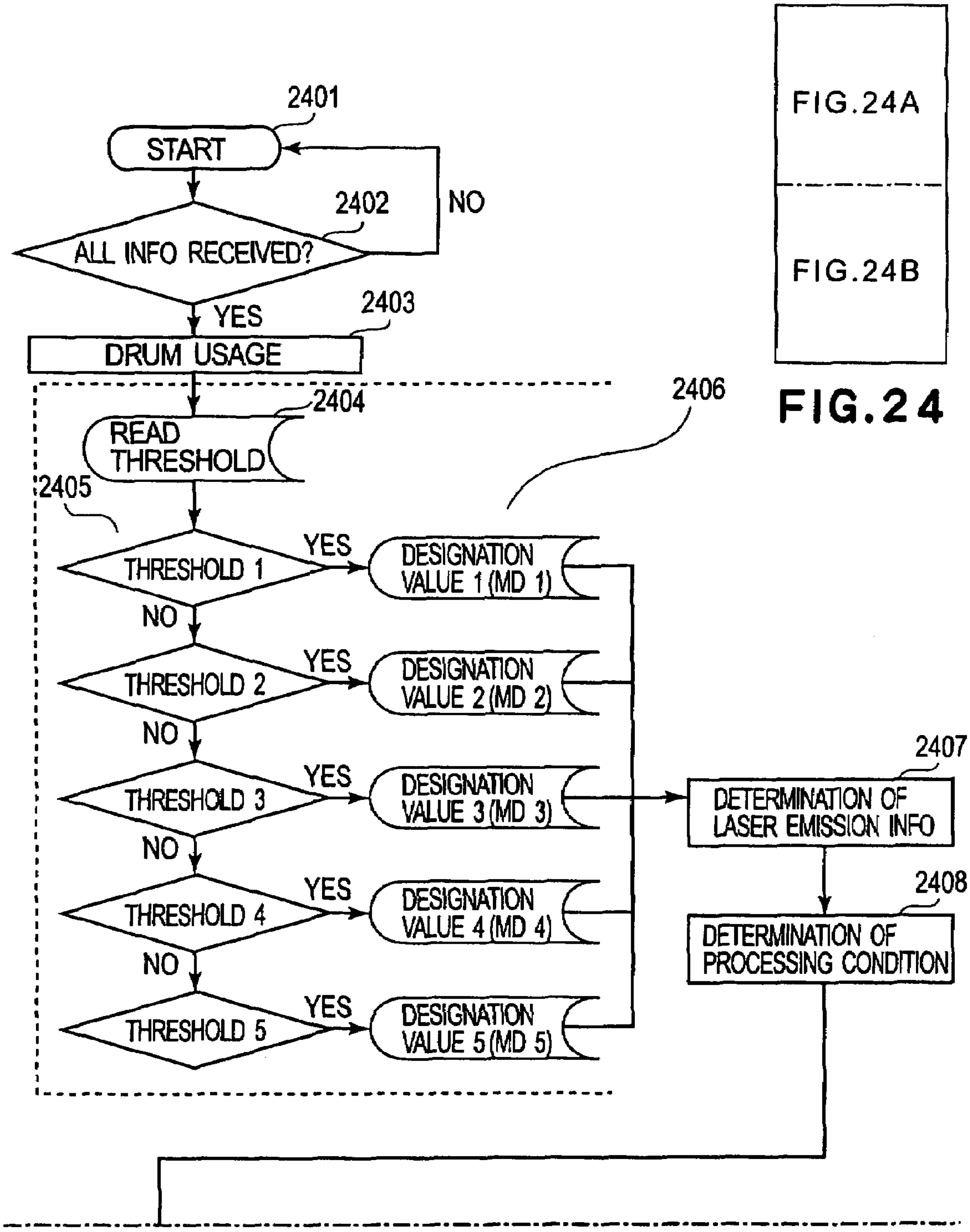
Figure 24B:
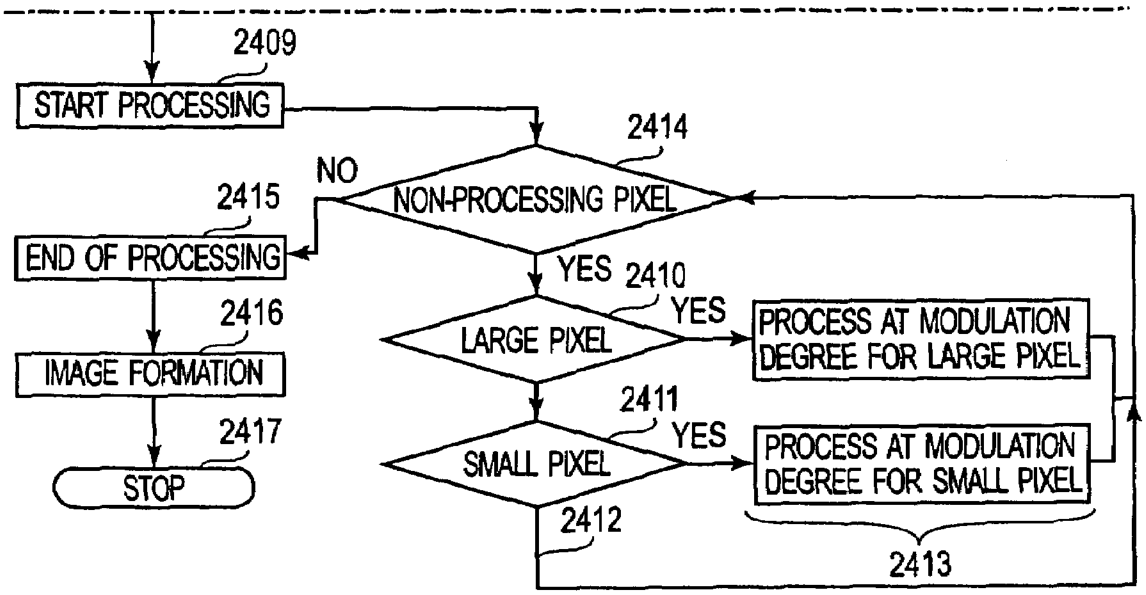

FIG. 24 is a schematic block diagram showing the relationship between FIGS. 24A and 24B, FIG. 24A is a portion of a flow chart regarding control in Embodiment 2, and FIG. 24B is the other portion of the flow chart regarding control in Embodiment 2.

Figure 25:
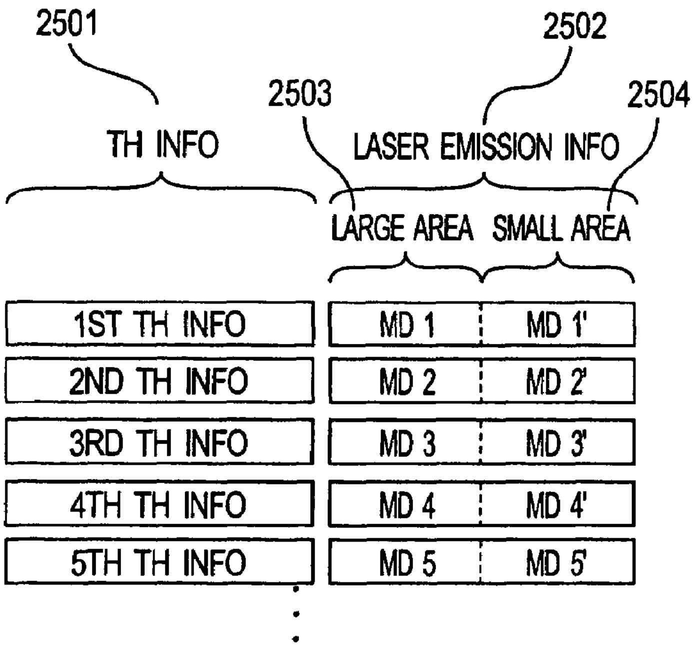

FIG. 25 is a schematic view showing switching threshold information stored in a storing device and the switching identification number storing mode in Embodiment 3.

Figure 26:
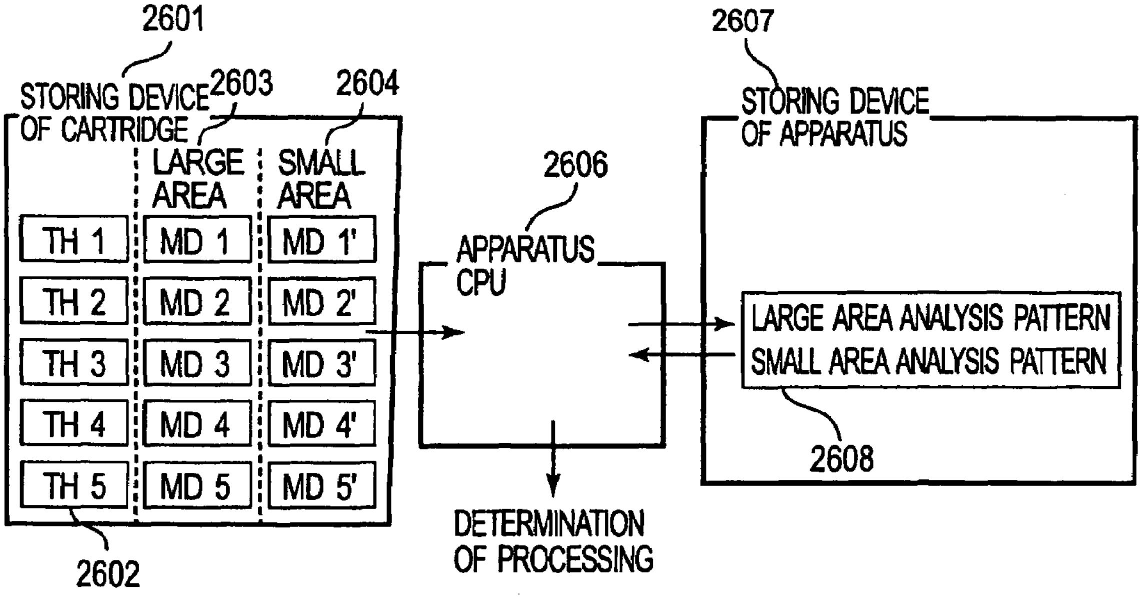

FIG. 26 is a schematic views showing a relationship between a storing device of cartridge, a CPU of apparatus main assembly, and a storing device of apparatus main assembly in Embodiment 3.

Figure 27A:
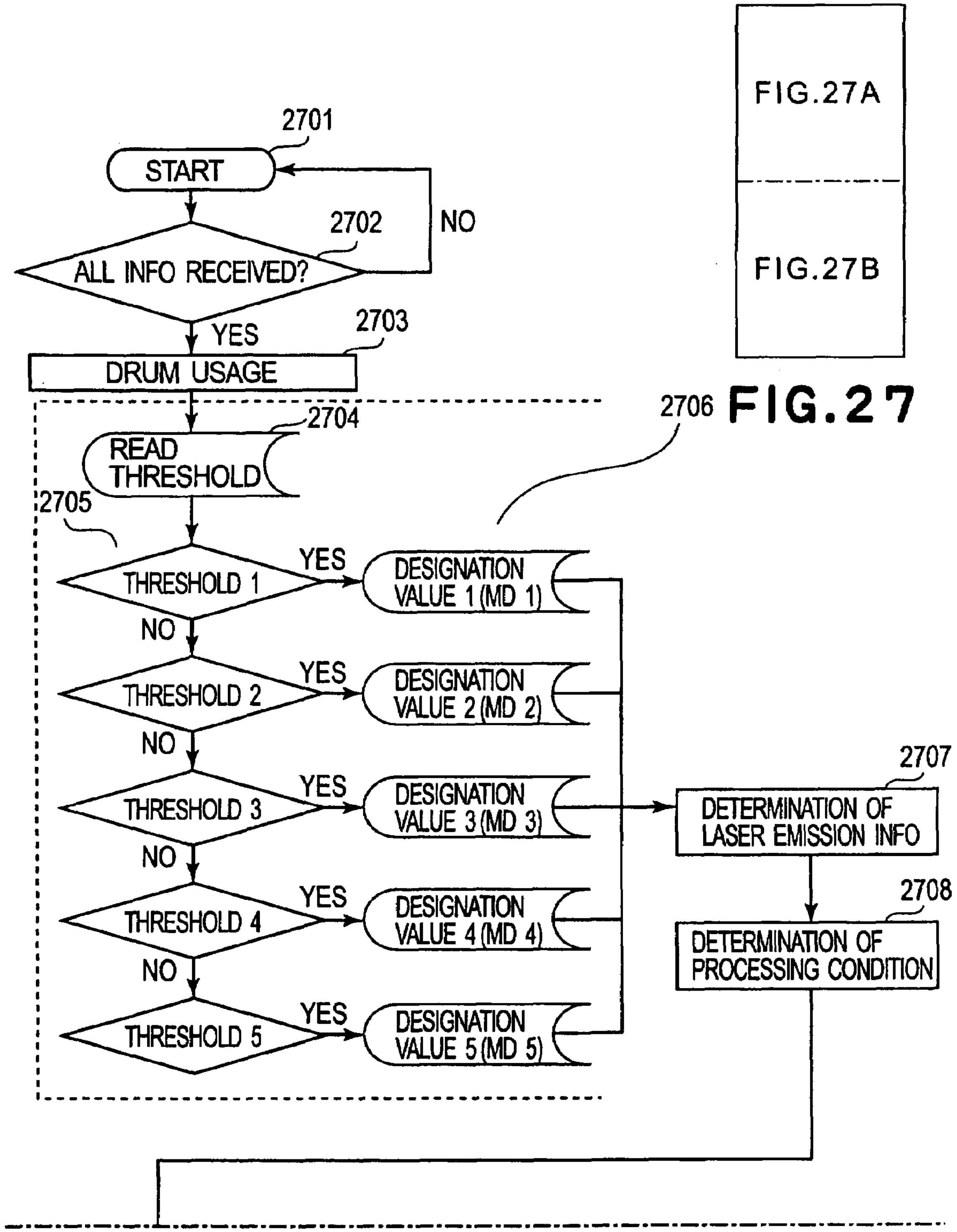
Figure 27B:
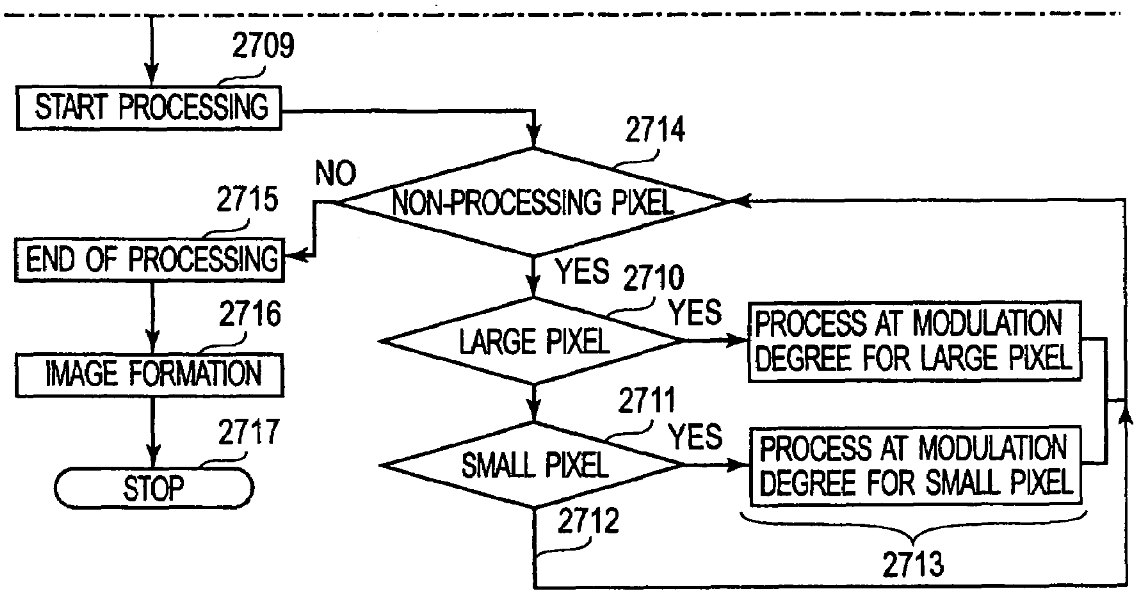

FIG. 27 is a schematic block diagram showing the relationship between FIGS. 27A and 27B, FIG. 27A is a portion of the flow chart regarding control in Embodiment 3, and FIG. 27B is the other portion of the flow chart regarding control in Embodiment 3.

Figure 28:
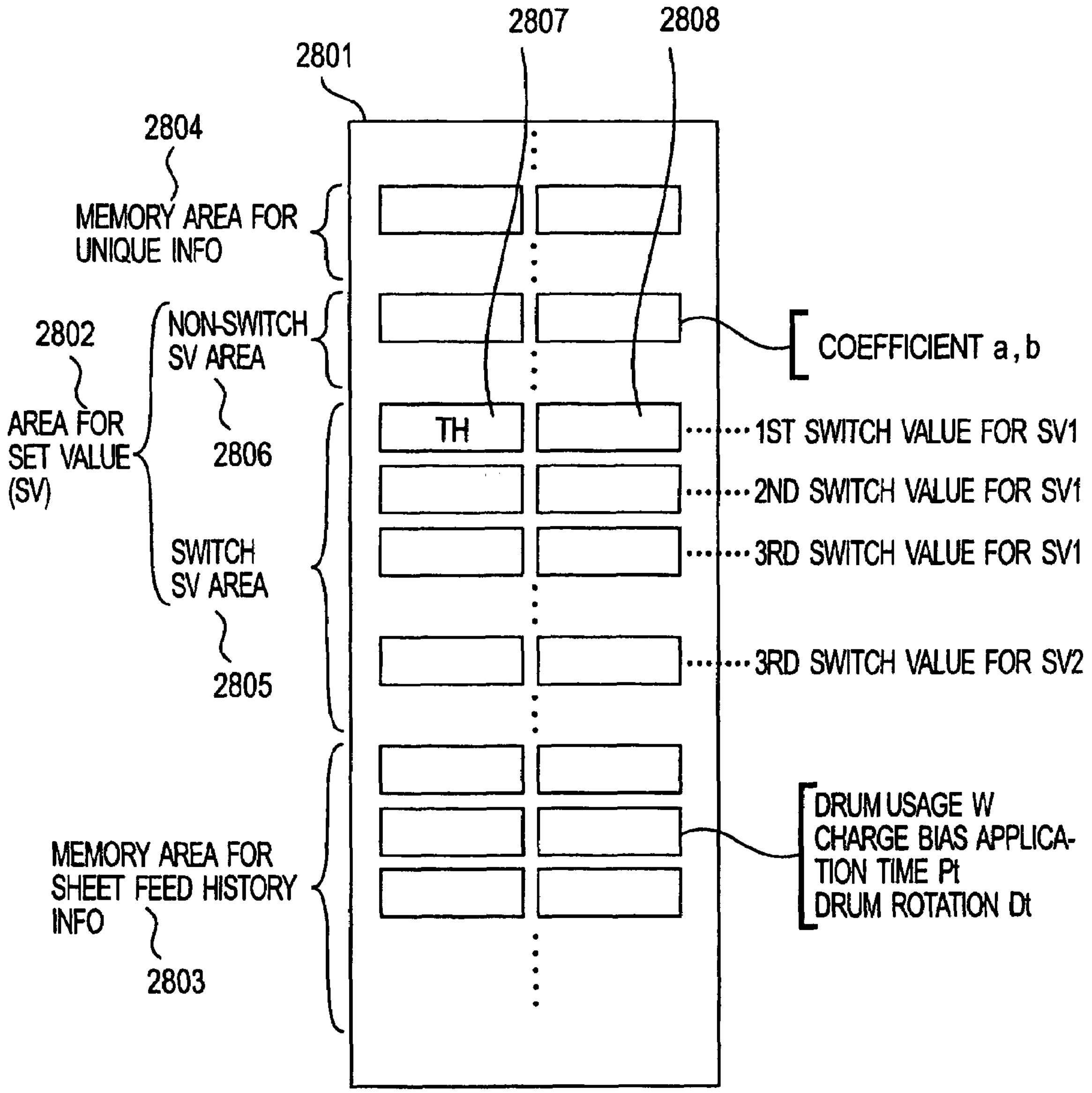

FIG. 28 is a schematic view regarding the storing device used in Embodiment 1.

Figure 29:
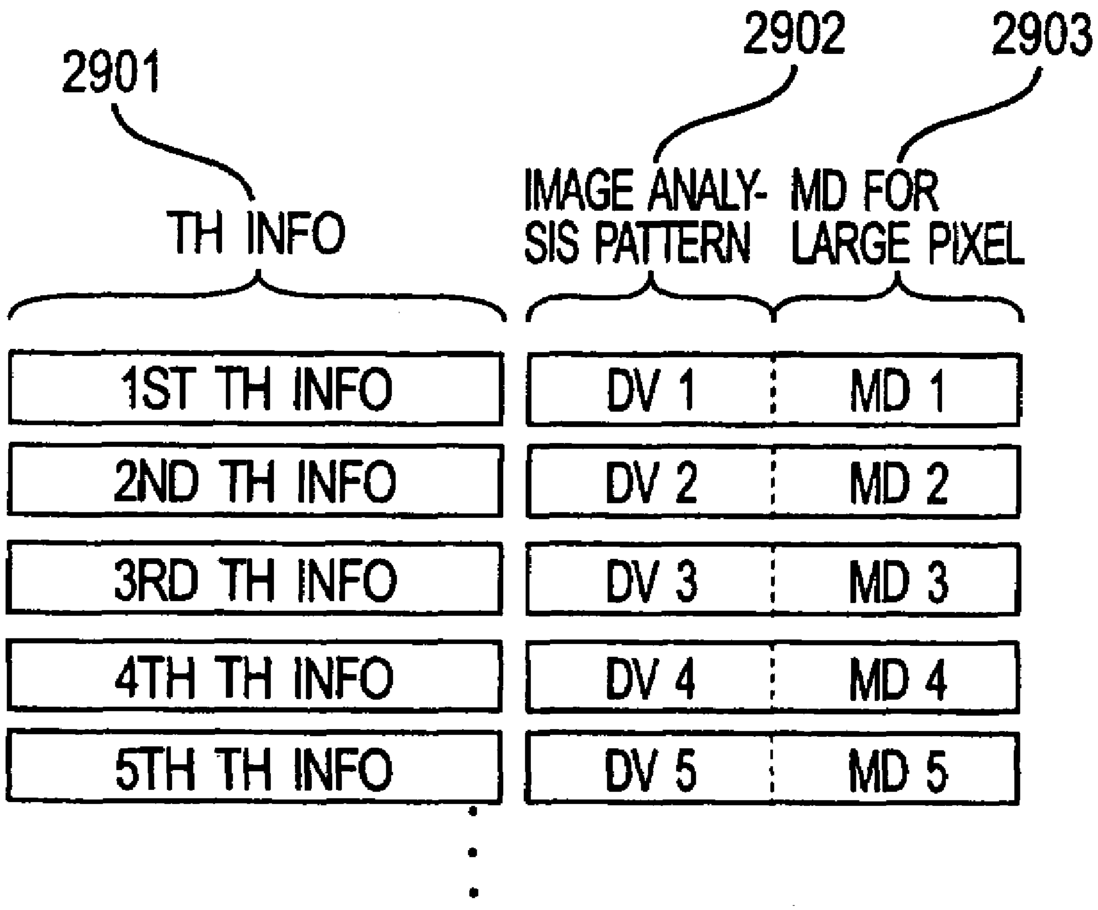

FIG. 29 is a schematic view showing switching threshold information stored in a storing device and the switching identification number storing mode in Embodiment 4.

Figure 30:
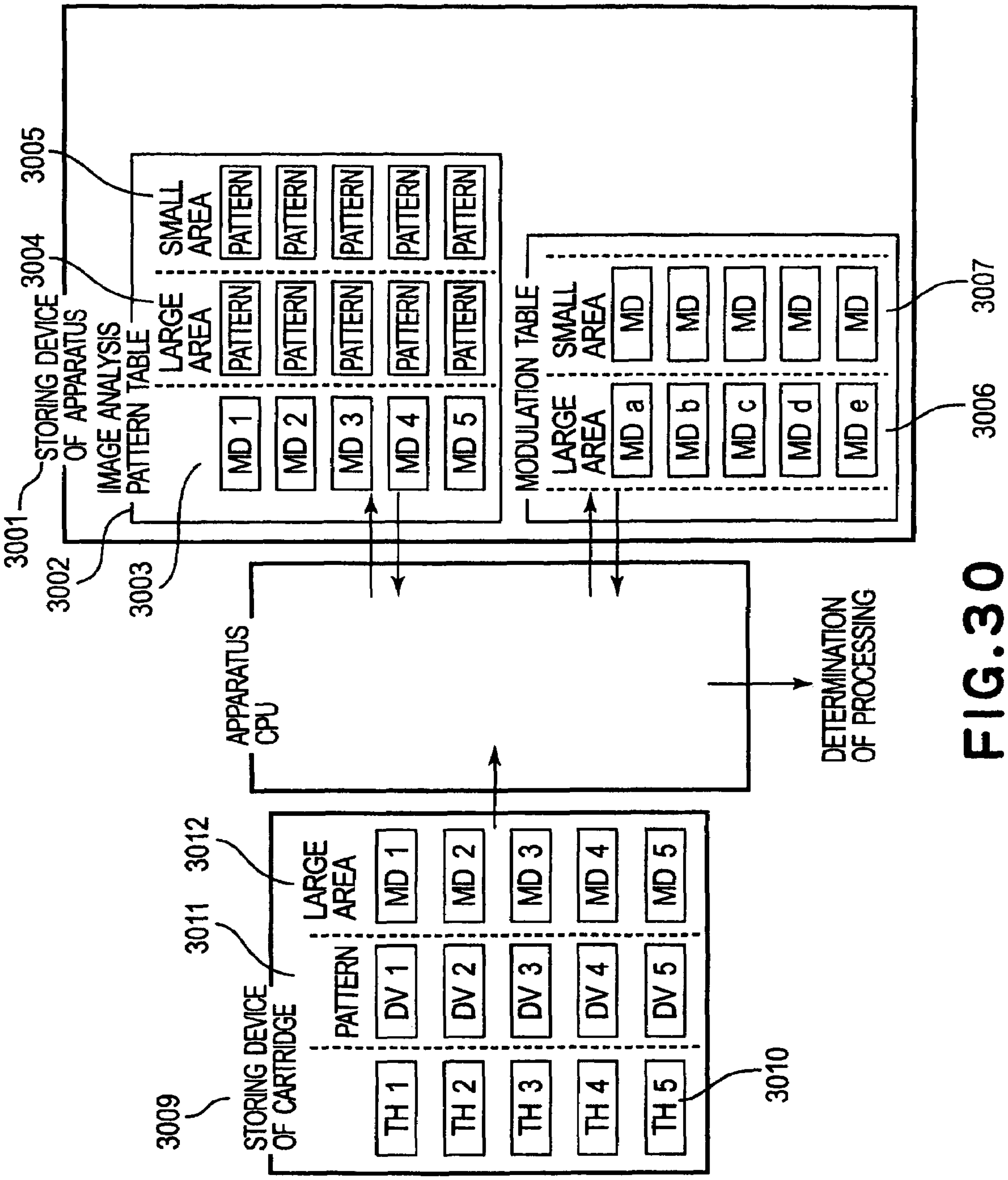

FIG. 30 is a schematic views showing a relationship between a storing device of cartridge, a CPU of apparatus main assembly, and a storing device of apparatus main assembly in Embodiment 4.

Figure 31A:
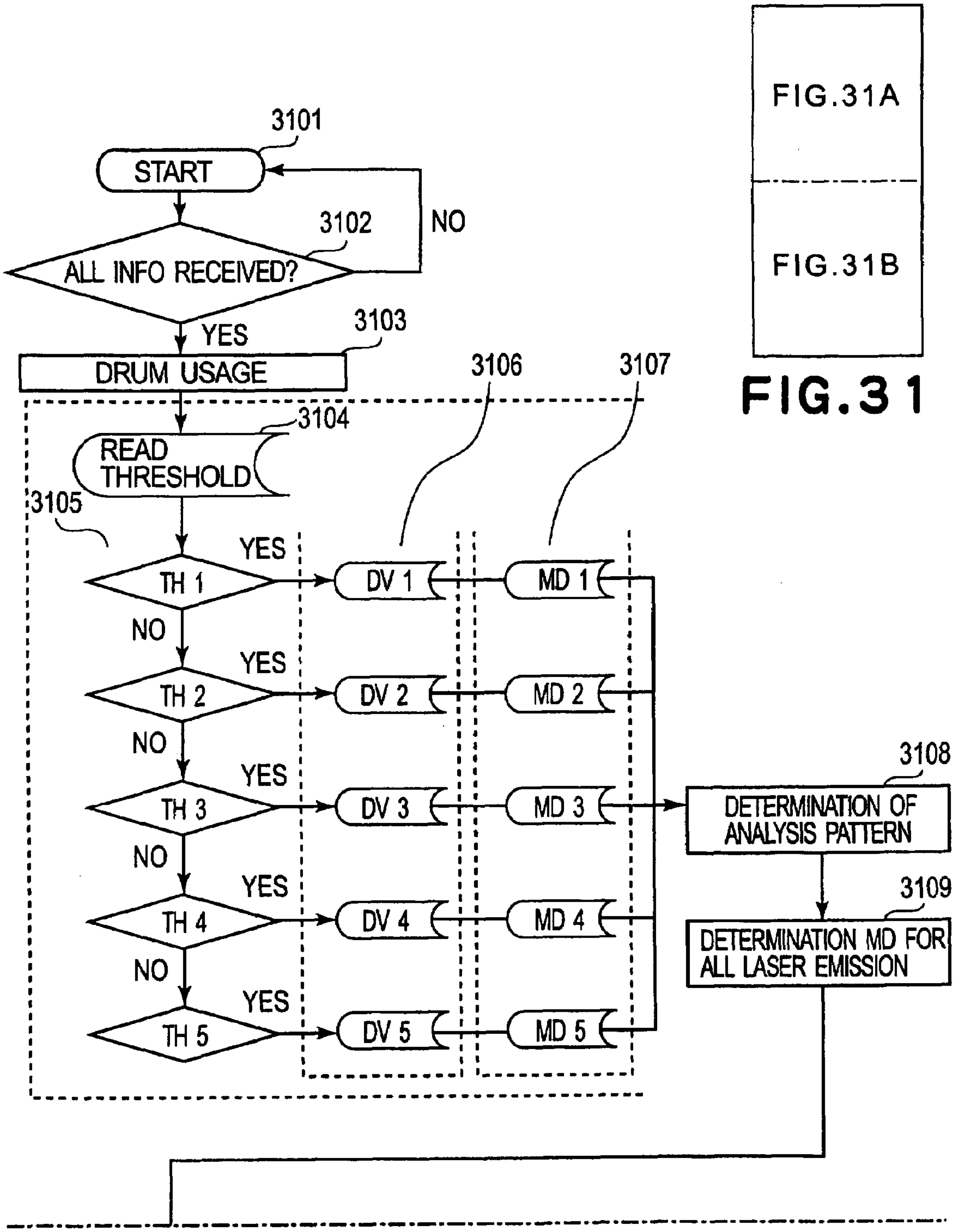
Figure 31B:
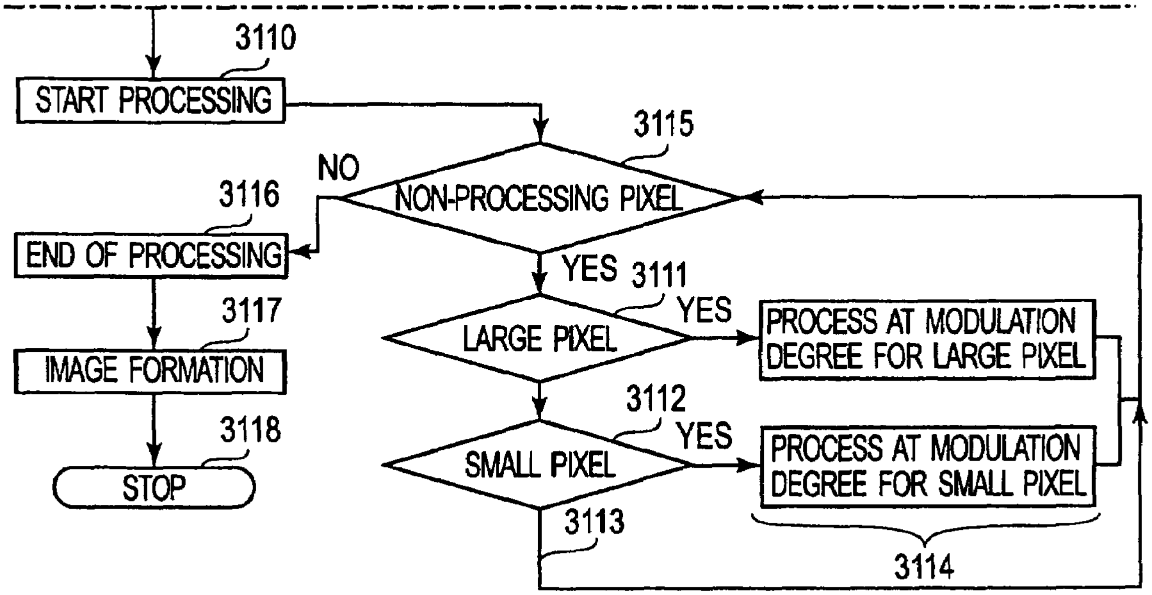

FIG. 31 is a schematic block diagram showing the relationship between FIGS. 31A and 31B, FIG. 31A is portion of a flow chart regarding control in Embodiment 4, and FIG. 31B is the other portion of the flow chart regarding control in Embodiment 4.

Figure 32:
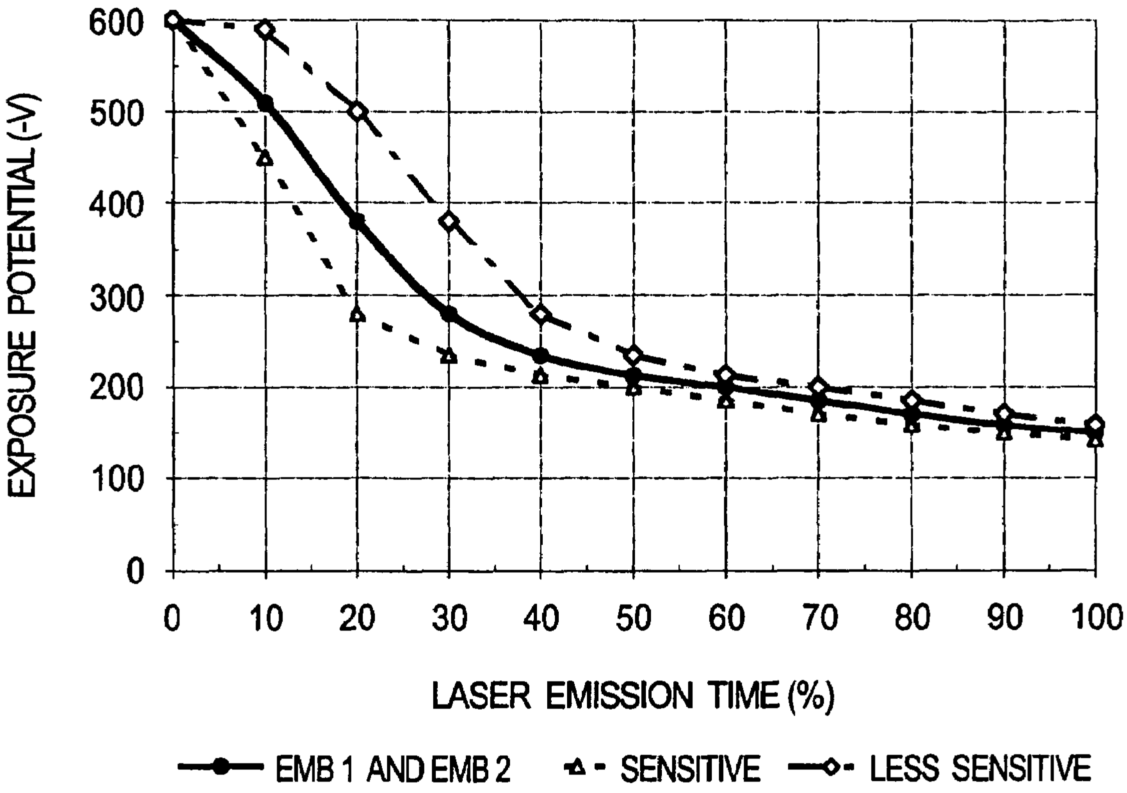

FIG. 32 is a graph showing a relationship between a sensitivity characteristic of image bearing member and an exposure potential in Embodiment 1.

Figure 33:
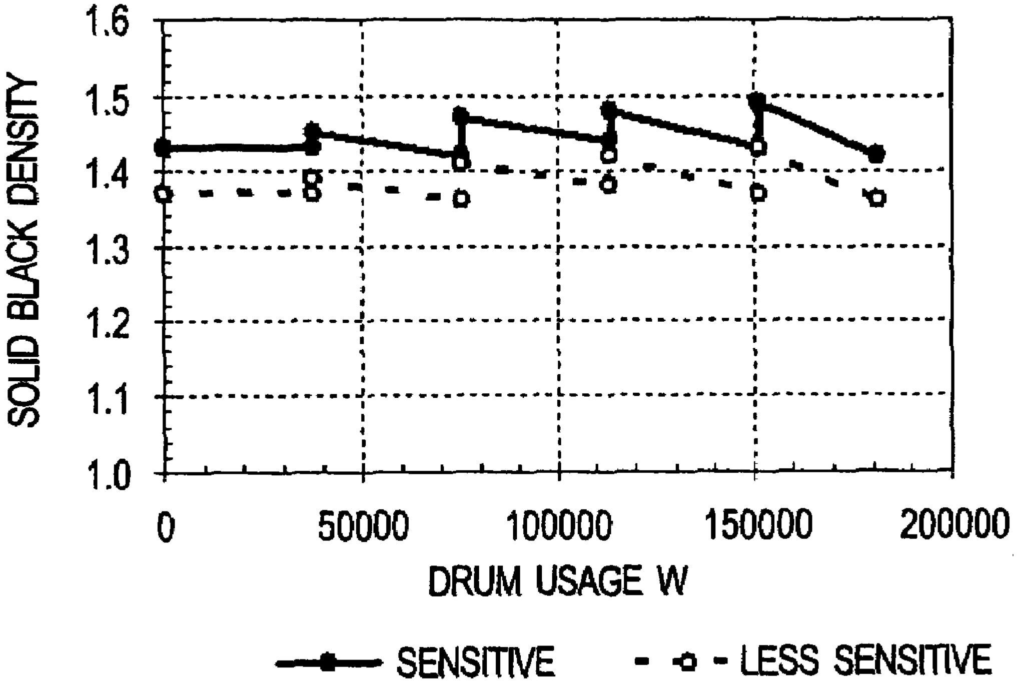
Figure 33:
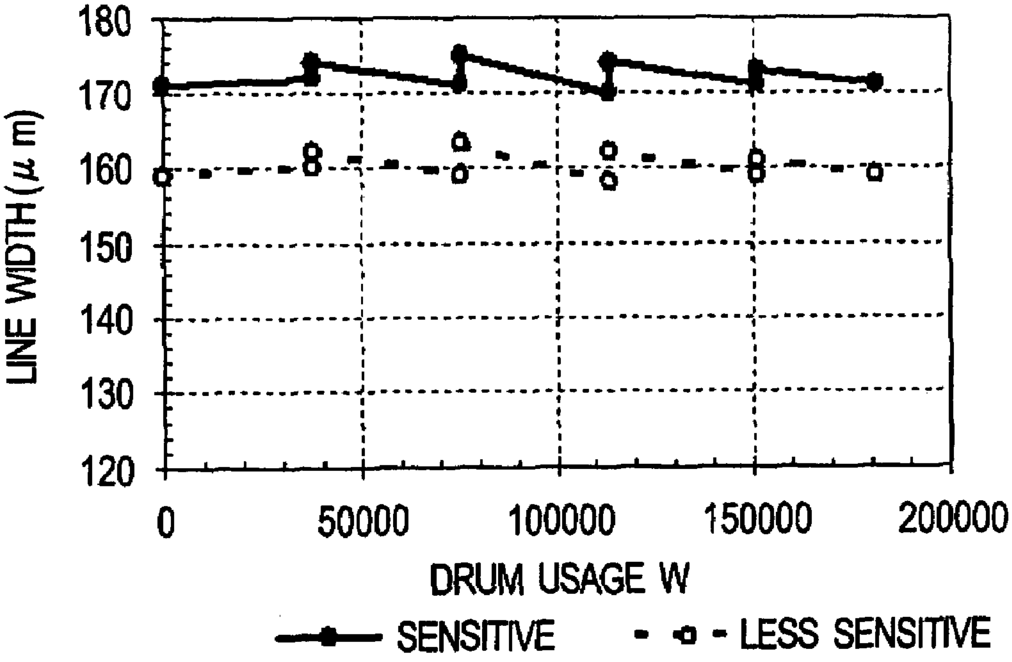

FIGS. 33(*a*) and 33(*b*) are graphs showing the relationship between the sensitivity characteristic and the solid black image and between the sensitivity characteristic and the line width in Embodiment 1.

FIGS. 34(*a*) and 34(*b*) are tables showing the switching timing and the modulation degree of a laser-on period for image bearing members having different photosensitive characteristics in Embodiment 1.

FIGS. 35(*a*) and 35(*b*) are tables showing the switching timing and identification information for image bearing members having different photosensitive characteristics in the storing device used in Embodiment 1.

Figure 36:
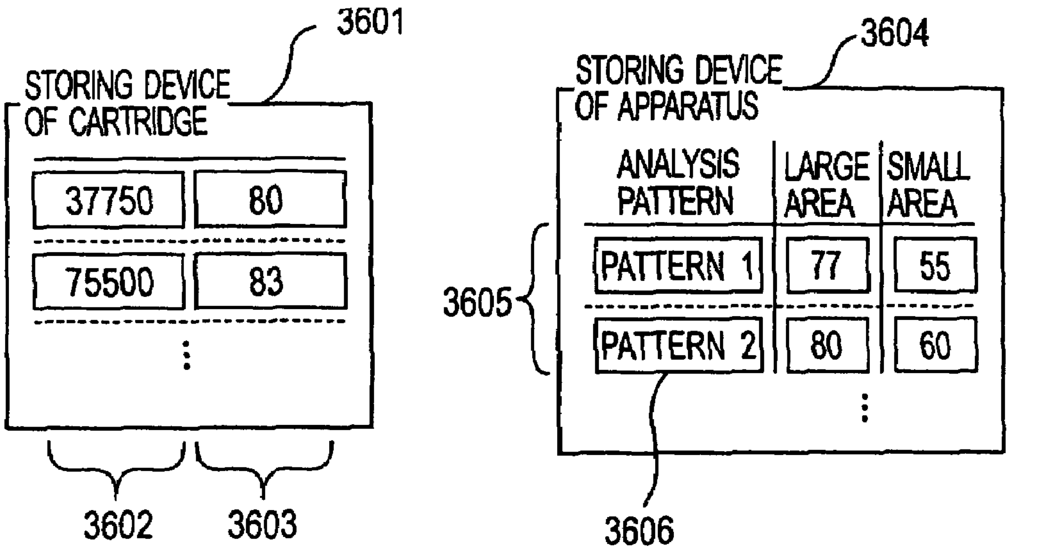
Figure 37:
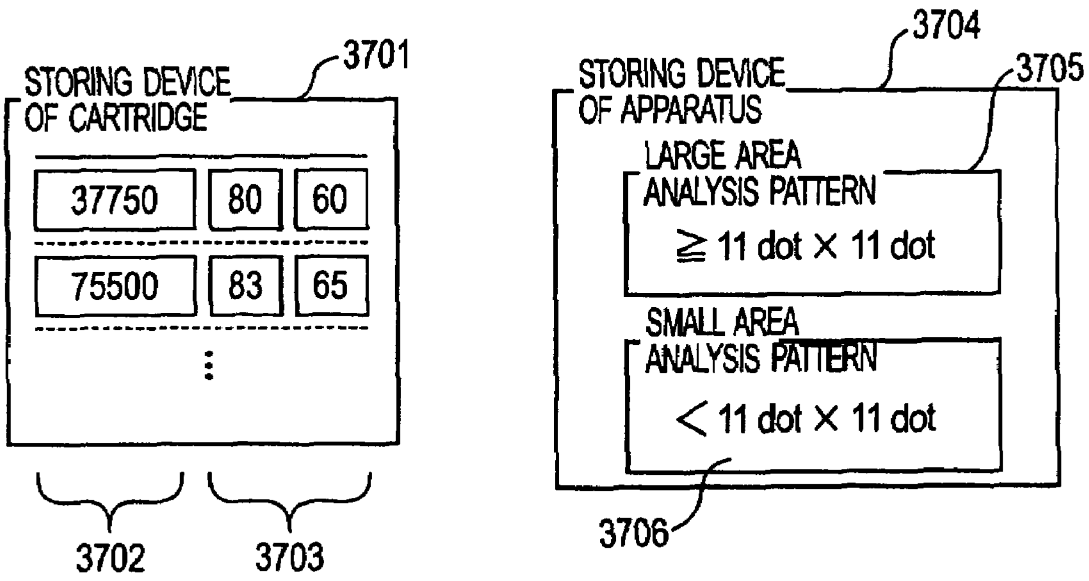
Figure 38:
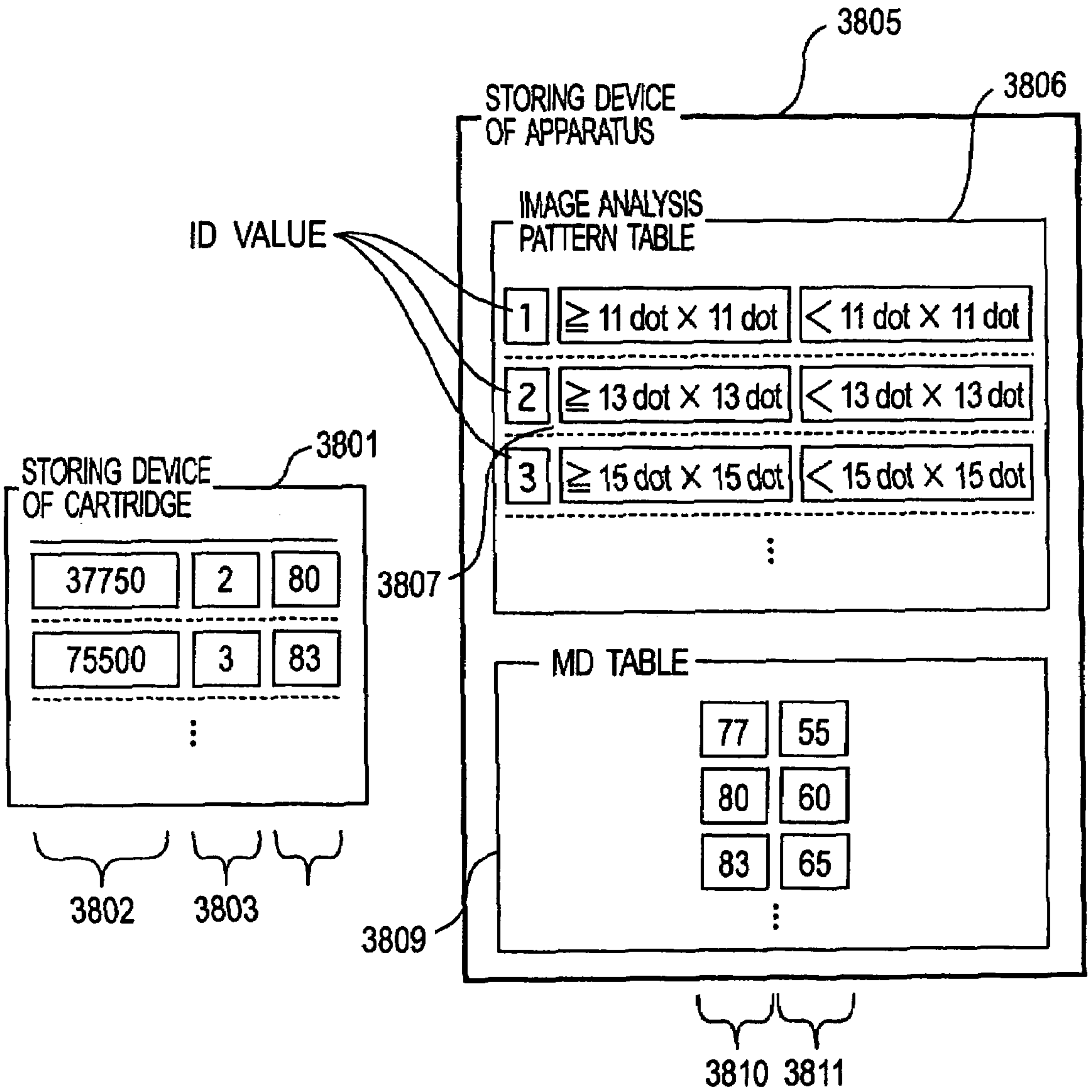

FIGS. 36, 37 and 38 are schematic explanatory views for determining image processing methods in Embodiments 2, 3 and 4, respectively.

BEST MODE FOR CARRYING OUT THE INVENTION

Embodiment 1

Figure 2:
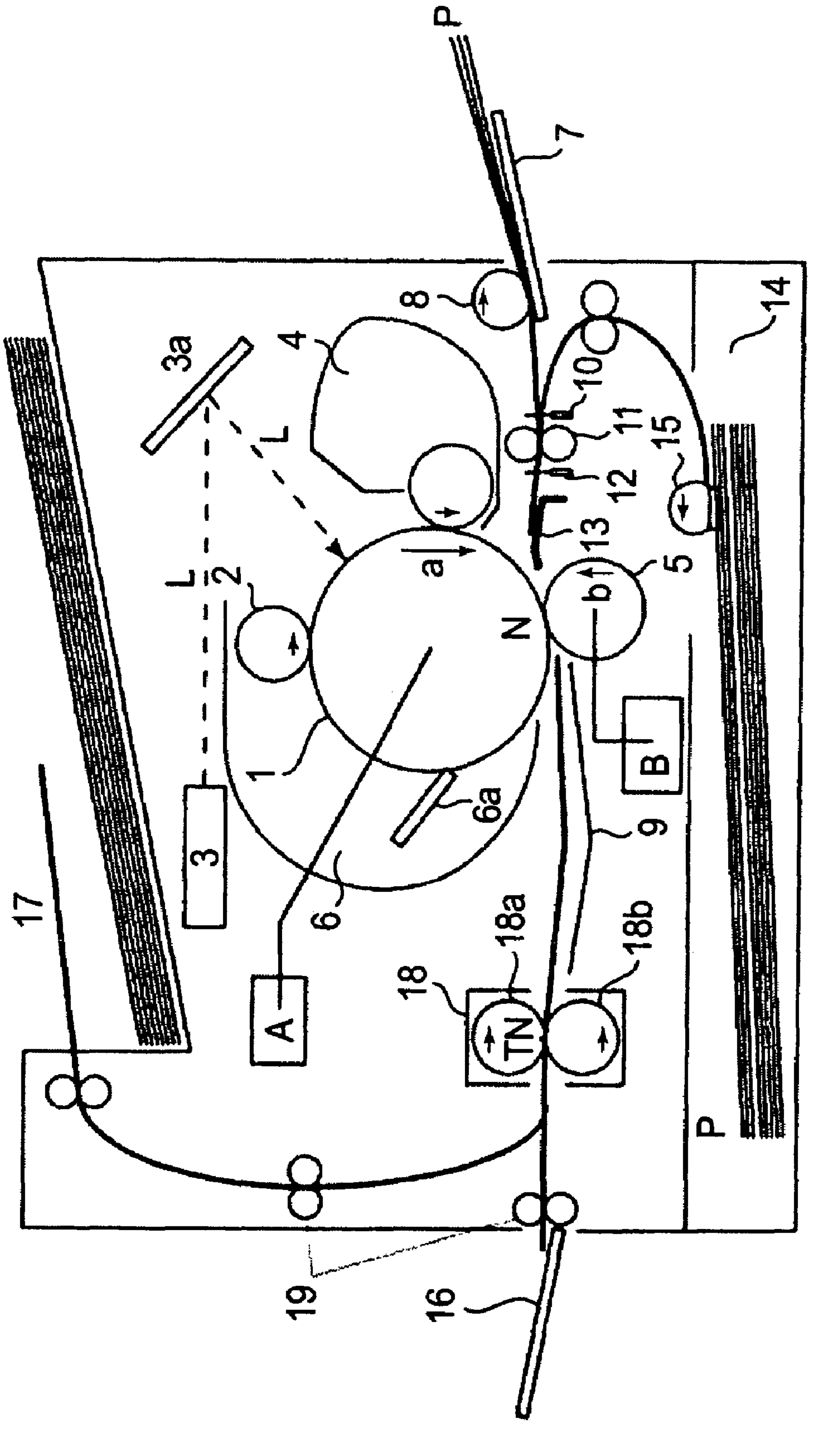
FIG. 2 is a schematic explanatory view for illustrating an image forming apparatus according to Embodiment 1 of the present invention.
Figure 3:
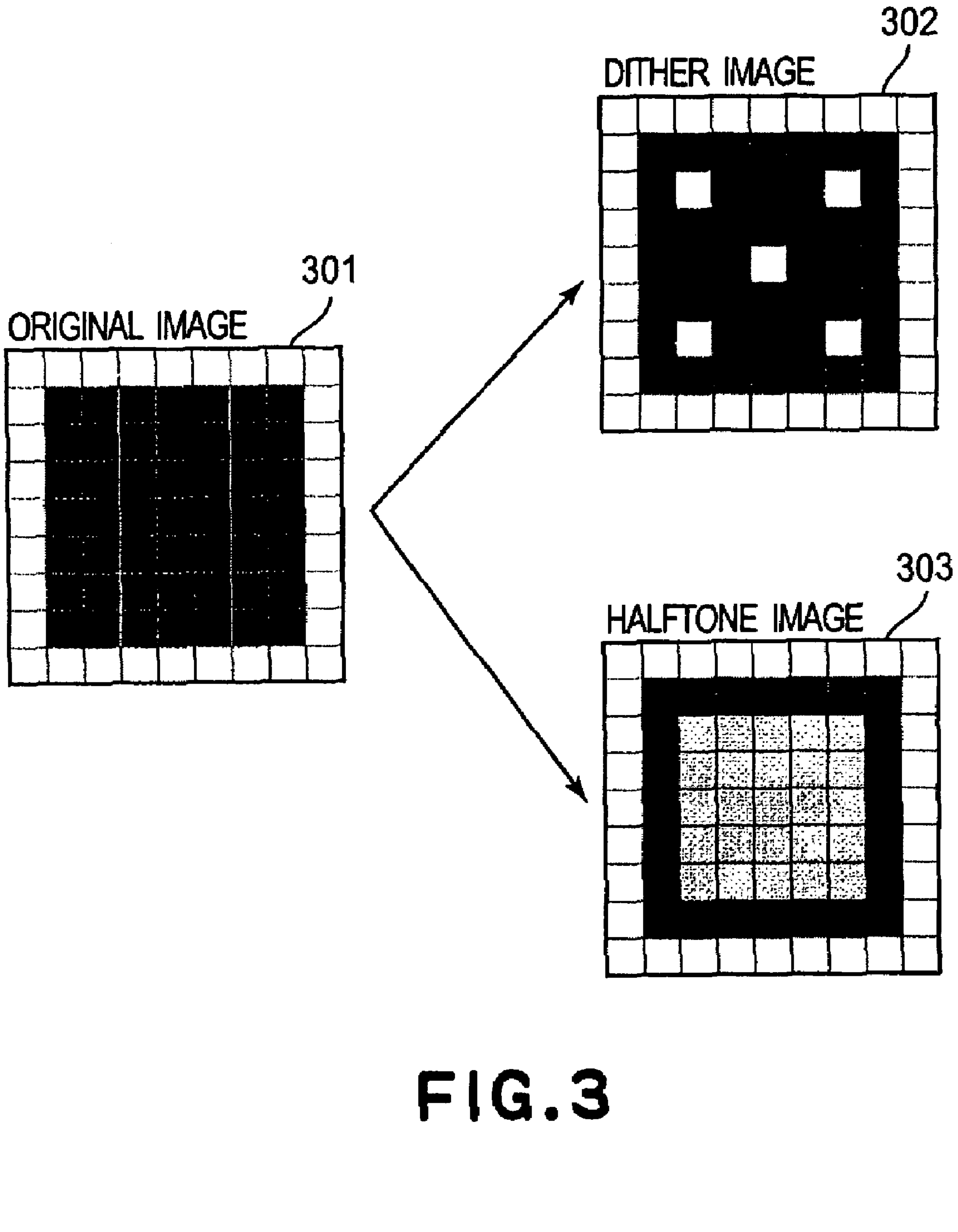
FIG. 3 is a schematic explanatory view for illustrating a conventional image processing.

FIG. 2 is a schematic sectional view showing the image forming apparatus according to threshold information of the present invention.

In FIG. 2, the image forming apparatus includes a photosensitive image bearing member 1, as an image bearing member, which is prepared by forming a photosensitive material, such as an OPC or an amorphous Si, on a cylindrical substrate of aluminum, nickel, or the like, and is rotationally driven by drive means A in a clockwise direction of an indicated arrow a at a predetermined peripheral speed.

The image forming apparatus further includes charging means 2 for uniformly charge-treating a peripheral surface of a rotating photosensitive image bearing member 1 to a predetermined polarity and a predetermined potential. In this embodiment, a contact charging device using a charge roller is used.

The image forming apparatus further includes image information exposure means 3, and in this embodiment, a laser beam scanner is used as the exposure means.

This scanner 3 includes a semiconductor laser, a polygon mirror, F−θ lens, etc., and scans and exposes the uniformly charged surface of the photosensitive image bearing member by emitting a laser beam L which is ON/OFF controlled depending on image information sent from an unshown host apparatus, thus forming an electrostatic latent image. A developing device 4 constituting a process cartridge develops the electrostatic latent image on the photosensitive image bearing member 1 as a toner image.

As a developing method, a jumping development, a two component development, or the like is used. In many cases, a combination of image exposure and reversal development is employed.

A transfer roller 5, having an elastic layer, as a rotating member-like contact charging member is caused to contact the photosensitive image bearing member 1 under pressure to form a transfer nip portion N therebetween, and is rotationally driven by drive means B in a counterclockwise direction of an indicated arrow b at a predetermined peripheral speed.

The toner image formed on the photosensitive image bearing member 1 is successively electrostatically transferred onto a recording material P to be recorded (a transfer-receiving material) which is fed from a paper feed portion to the transfer nip portion N.

The recording material P fed from the paper feed portion, such as a manual paper feed portion 7 or a cassette paper feed portion 14 is, after being placed in a standby state by a pre-feed sensor 10, fed to the transfer nip portion N (image forming portion) through registration rollers 11, a registration sensor 12, and a pre-transfer guide 13.

The recording material P is fed to the transfer nip portion N, created between the photosensitive image bearing member 1 and the transfer roller 5, in synchronism with the toner image formed on the photosensitive image bearing member 1 by the registration sensor 12.

Further, in order to solve a double feeding problem that a plurality of recording material sheets are erroneously fed simultaneously at the time of feeding the recording material P at the paper feeding portion, separation rollers (8, 15) or the like are disposed. The recording material P pausing through the transfer nip portion N where it receives the toner image, is separated from the surface of the photosensitive image bearing member and fed to a fixing device 18 through a sheet passage 9. The fixing device 18 used in this embodiment is a film heating type fixing device consisting of a pair of pressing rollers including a heating film unit 18*a* and a pressure roller 18*b*. The recording material P holding the toner image is sandwiched and fed in a fixing nip portion TN, which is a pressure-contact portion, between the heating film unit 18*a* and the pressure roller 18*b*, and subjected to heat and pressure application, whereby the toner image is fixed on the recording material to become a permanent image.

The recording material P on which the toner image is fixed is guided by discharge rollers 19 to be discharged in a face-up discharge port 16 or a face-down discharge port 17.

On the other hand, the surface of the photosensitive image bearing member after being subjected to transfer of the toner image onto the recording material P is cleaned by removing a transfer residual toner by a cleaning device 6 of the process cartridge, thus being repetitively subjected to image formation. In this embodiment, the cleaning device 6 is a blade cleaning device having a cleaning blade 6*a*.

Then, a controller and the process cartridge of the image forming apparatus according to the present invention will be described in detail with reference to FIG. 1.

An electrophotographic image forming apparatus (hereinafter, simply referred to as "(apparatus) main assembly") used in this embodiment is a laser beam printer which receives image signals from a host computer and outputs the signals as a visualized image. The apparatus is of the type wherein consumable members, such as the photosensitive image bearing member, the developing means, and the developer (toner), are integrally supported as a process cartridge which is detachably mountable to the apparatus main assembly.

Figure 1:
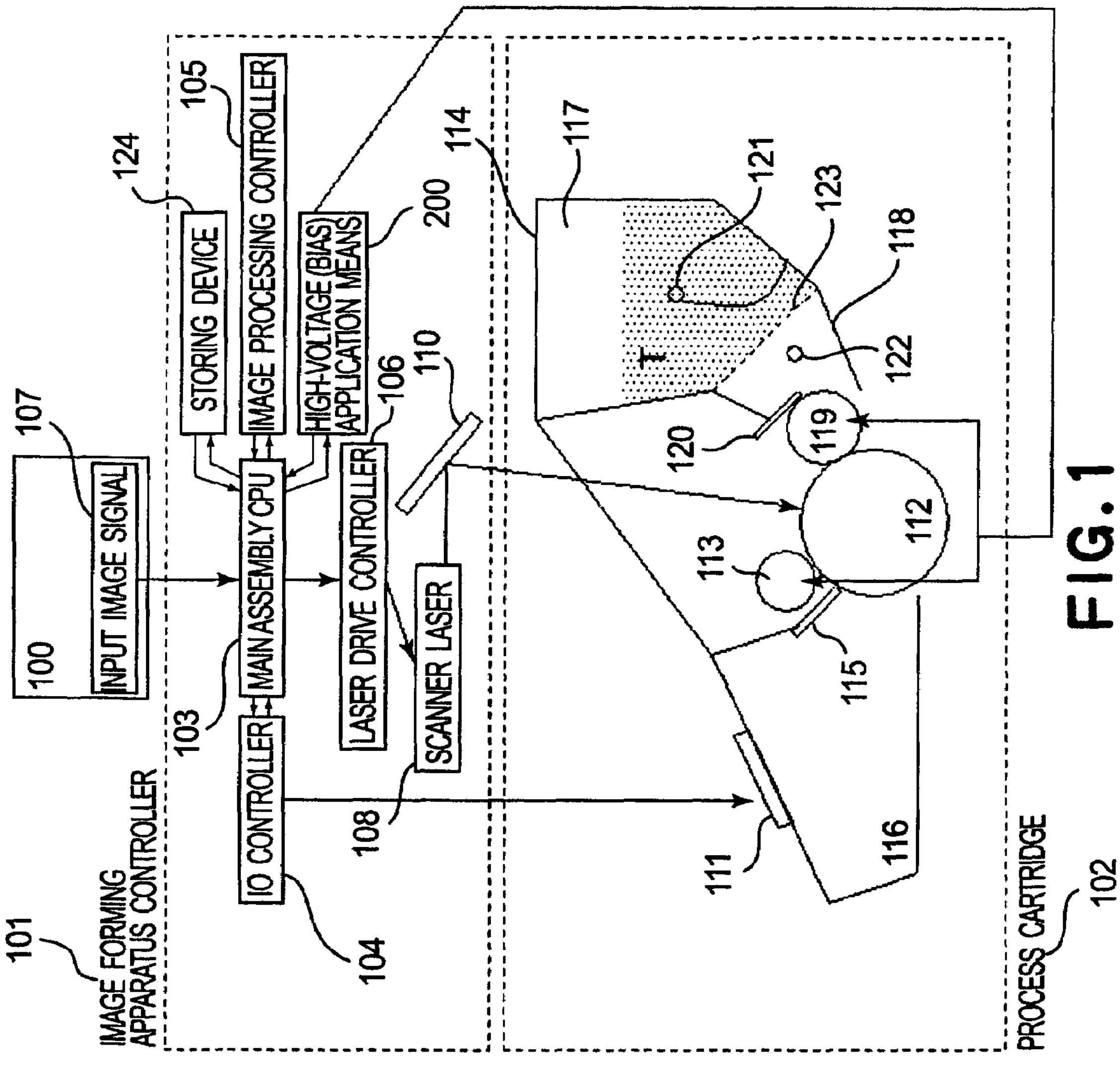
FIG. 1 is a schematic explanatory view for illustrating image formation according to Embodiment 1 of the present invention.

As shown in FIG. 1, an image forming apparatus controller 101 includes a (main assembly) CPU 103 as a central processing computing unit for performing image forming operation of the main assembly, an IO controller 104 for effecting communication with a storing device mounted to the cartridge, an image processing controller 105 for effecting image processing of a resultant image signal, a high-voltage output controller 200 for effecting control of a high-voltage output, such as a charging bias voltage or a developing bias voltage, a laser drive controller 106 for performing emission control of a laser (beam) scanner depending on an output image signal, and a storing device 124 for storing set values such as a process condition, an image processing method (procedure), and image information sent from the host computer.

In the case where a process cartridge 102 is inserted into the apparatus main assembly and then a power to the main assembly is turned on, the IO controller 104 communicates with a storing device 111 mounted to the cartridge 102 to obtain various storage values, such as the process condition and an operating history. The resultant storage values obtained by the IO controller 104 are sent to the main assembly CPU 103 together with those stored in the storing device 124, and treated with those stored in the storing device 124, and treated as data at the time of effecting image formation.

The image signal 107 sent from a computer main assembly as an image formation input unit 100 connected to the image forming apparatus is subjected to image processing, such as an edge treatment or a density adjustment, thus being treated as an image signal capable of effecting optimum image formation.

The main assembly CPU 103 computes an optimum process condition value from the storage value obtained from the storing device 111 of the cartridge and the image signal to which image processing is completed, and forms an image at the optimum process condition value.

Further, the process cartridge 102 is prepared by integrally supporting the (photosensitive) image bearing member 112, a charge roller 113 as a charging means for uniformly charging the image bearing member 112, a developing device 114, a cleaning blade 115 as a cleaning means for cleaning the surface of the image bearing member 112, and a waste toner container 116 for containing a residual toner removed from the image bearing member 112 by the cleaning blade 115, and is detachably mounted to the apparatus main assembly.

The developing device 114 includes a toner container 117 as a developer containing portion for containing toner T as developer, a developer container 118 connected with the toner container 117, a developing roller 119 as a developing means disposed opposite to the image bearing member 112, a developing blade 120 as a developer regulation member for regulating a toner layer thickness, a toner container inner stirring member 121 for stirring the toner T in the toner container 117 to feed the toner T into the developer container 118, and a stirring member 122 for feeding the toner T fed from the toner container 117 to the developing roller 119.

Further, before the cartridge is used, a toner sealing member 123 is adhered between the toner container 117 and the developer container 118.

The toner sealing member 123 is disposed so as to prevent the toner from leaking even in the case where a strong impact is caused to occur, e.g., during transport of the cartridge, and is removed by a user immediately before the mounting of the cartridge to the main assembly.

Incidentally, in this embodiment, insulating magnetic one component toner is used as the developer.

In the storing device 111 used in this embodiment, image forming process set values, such as charging and developing bias voltage set values required for image formation and a light quantity set value of the laser as the exposure means, and amounts of usages, such as an amount of usage of the image bearing member and an amount of residual toner, are stored. Further, in the case where the bias voltage set value or the like is switched depending on a sheet feeding history, in the storing device 111, e.g., threshold information or a set value which is switched based on the threshold information is stored.

By using the above described structure, the image bearing member is uniformly charged by the charge roller and the surface of the image bearing member is subjected to scanning exposure with laser light that varies depending on an image signal emitted from the laser scanner, whereby an electrostatic latent image providing an objective image information is formed. The electrostatic latent image is visualized as a toner image by attaching the toner thereto by the action of the developing roller or the like.

Figure 4:
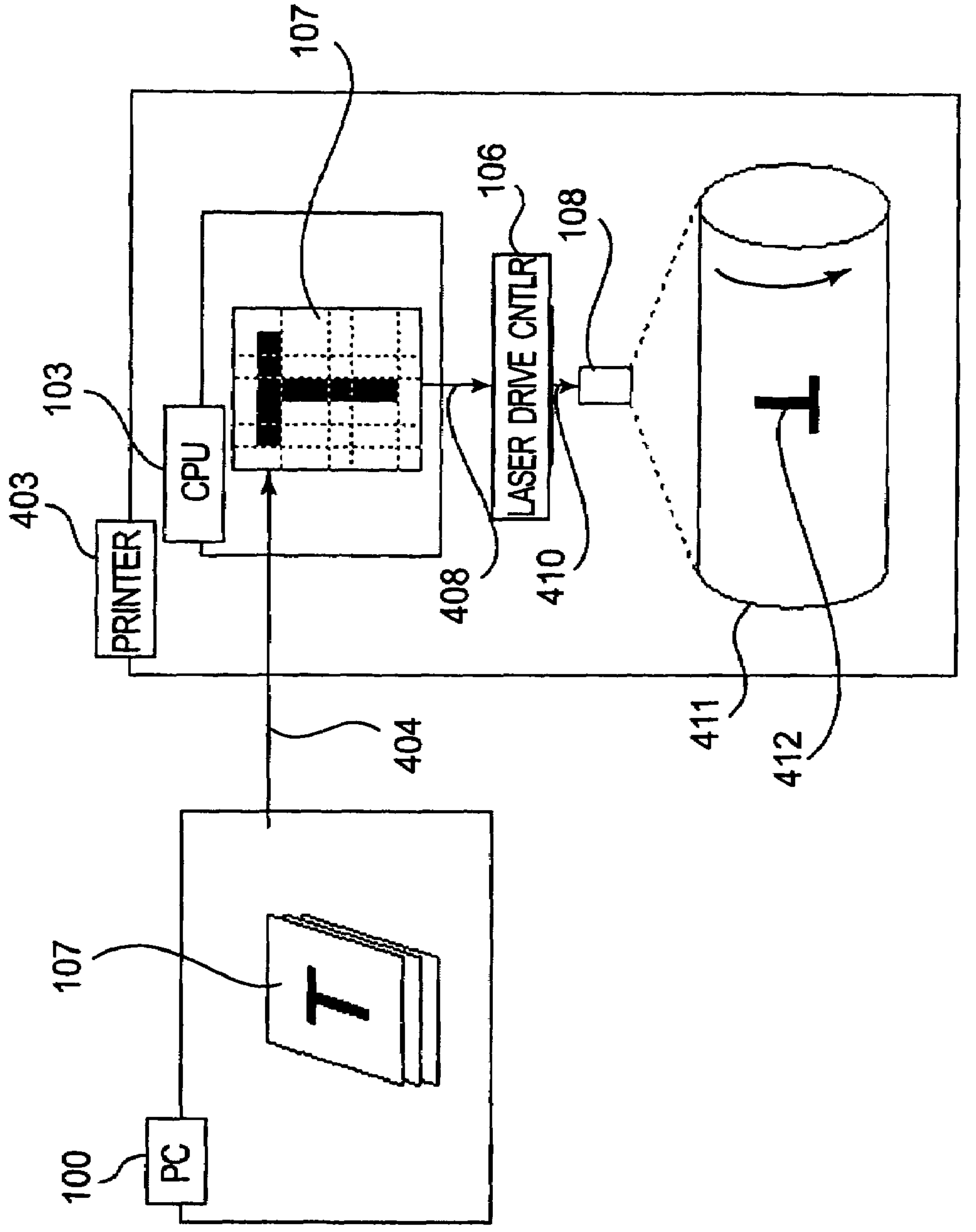
FIG. 4 is a schematic explanatory view for illustrating image formation according to Embodiment 1.

FIG. 4 is a view showing the flow of image processing and outline of the image processing will be described with reference to FIG. 4.

Identical reference numeral (signs) are indicated for members (means) identical to those shown in FIG. 1.

Referring to FIG. 4, to a main assembly of a printer, computer equipment 100, such as a personal computer or a host computer, which transmits image information 107 such as a character (text) or graphics, is connected. The computer equipment 100 sends the image information 107 to the printer main assembly through a signal line 404, and the sent image information 107 is sent to a main assembly CPU 103 in the printer main assembly 403 or a volatile storing device (not shown), provided in the CPU 103, for temporarily storing image data up to a period wherein an image is outputted.

When it is confirmed that all the image information 107 to be printed on one recording sheet are obtained, the printer main assembly starts a printing operation. After the start of the printing operation, the image information 107 is sent to a laser drive controller 106 through a signal line 408. On the basis of the image information 107, the laser drive controller 108 transmits a signal for controlling emission/non-emission of laser light of a laser scanner 108 through a signal line 410, thus forming an electrostatic latent image 412 on a photosensitive member 411.

Into the image data sent from the computer equipment, an emission control code for the laser scanner is inputted for every one dot, which is a minimum resolution of the printer main assembly. For example, binary data as to whether the dot is printed or not printed is stored, or multi-level data including halftone data for gray is stored. The minimum resolution unit, i.e., one dot, is referred to as one pixel.

Based on the binary or multi-level data for every one pixel, an emission time or light quantity of the laser scanner 108 is controlled, whereby a potential difference of the electrostatic latent image is provided on the photosensitive member to control toner coverage and adjust the image density, thus providing a good gradation characteristic.

In an ordinary image formation mode, based on the data for each one pixel corresponding to an image signal, an amount of emission (emission time or emission light quantity) of the laser scanner 108 is controlled by the CPU 103, whereby laser emission is caused to occur, thus forming an image on the photosensitive member through formation of a latent image.

On the other hand, there is a mode for forming an image under an image forming condition different from that in the ordinary image formation mode, i.e., a low toner consumption mode for effecting printing by further reducing the amount of toner consumption below that used in the ordinary image formation mode to save toner. The low toner consumption mode in this embodiment will be described with reference to FIG. 5. The image processing method in this embodiment is effected on the basis of the degree of concentration of pixels in order to reduce the non-uniform amount of toner consumption.

With respect to selection of the ordinary image formation mode and the low toner consumption mode, it is possible to select the modes by a switch of an operation panel (not shown) provided to the image forming apparatus or command input from an external computer (e.g., 100 of FIG. 1).

The image processing method for reducing the non-uniform amount of toner consumption performed depending on a concentrated degree of pixels in this embodiment will be described with reference to FIG. 5. Identical members (means) are indicated for members (means) identical to those shown in FIG. 1.

Figure 5:
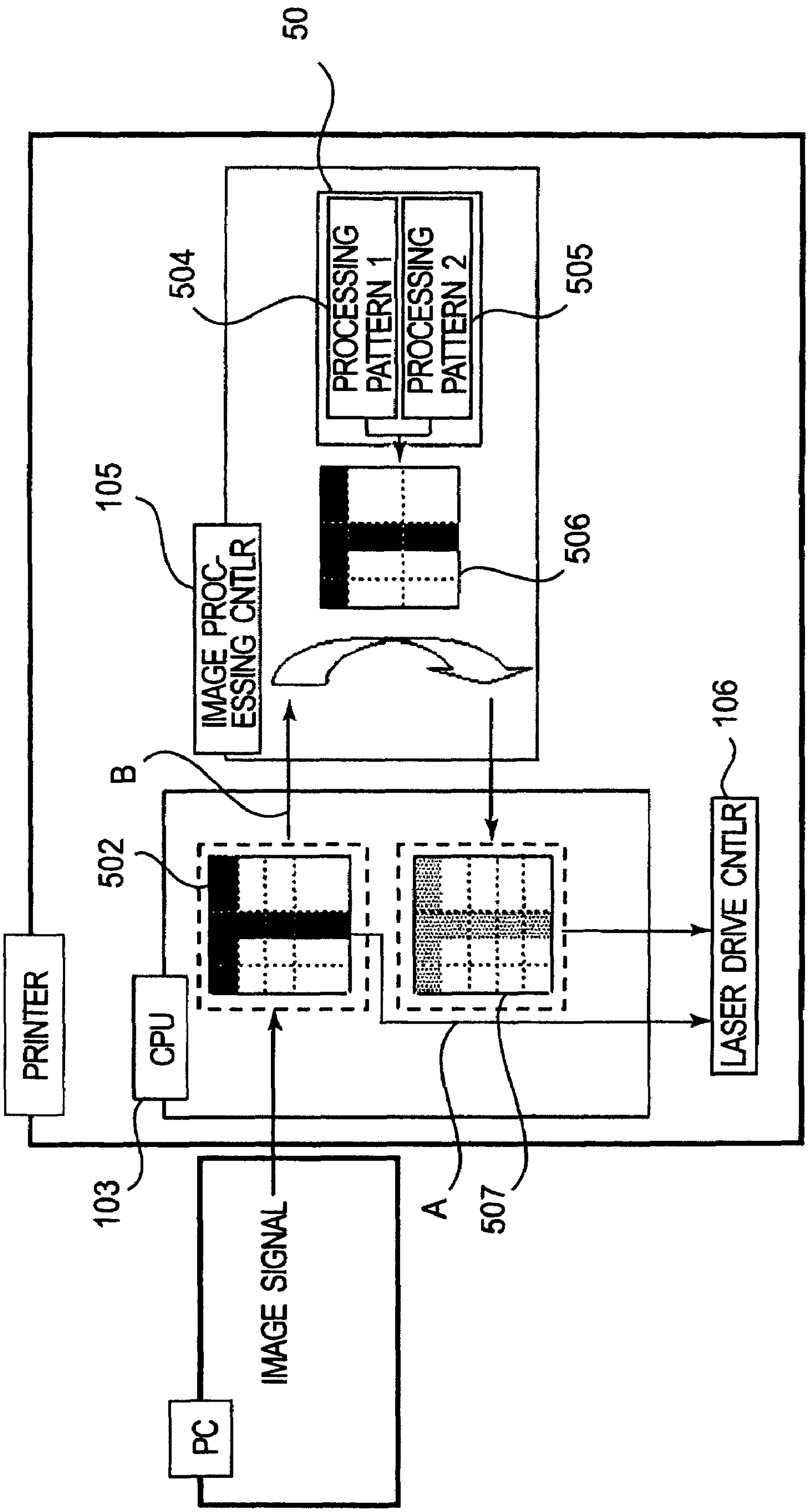
FIG. 5 is a schematic explanatory view for illustrating image processing according to Embodiment 1.

Referring to FIG. 5, image information sent from a external computer 100 to a laser (beam) printer is received by a CPU 103 of the laser printer and is stored in the CPU 103 or a storing device (not shown).

The CPU 103 makes a determination as to whether printing is performed in the ordinary image formation mode or the low toner consumption mode in accordance with an instruction signal from an unshown operation panel or a command from an external computer. In the case where the printing mode is determined as the ordinary image formation mode, image information (original image) 502 is sent to a laser drive controller 106 as shown by an arrow A. On the other hand, in the case where the printing mode is determined as the low toner consumption mode, the image information (original image) 502 is sent to an image processing controller 105 for effecting image processing. In the image processing controller 105, the original image is analyzed pixel by pixel, so that a pixel area is classified into the case of a concentrated pixel area having a small size and the case of a concentrated pixel area having a large size. In the case of the small size-concentrated pixel area, image processing is performed in a processing pattern 504 and in the case of the large size-concentrated pixel area, image processing is performed in a processing pattern 505.

After the image processing on image information 506 sent to the image processing controller 105 is completed, the resultant image information is again sent to the CPU 103 of the apparatus main assembly and is sent to the laser drive controller 106 as a processed image 507 after the image processing, thus being used for emission control.

Figure 6:
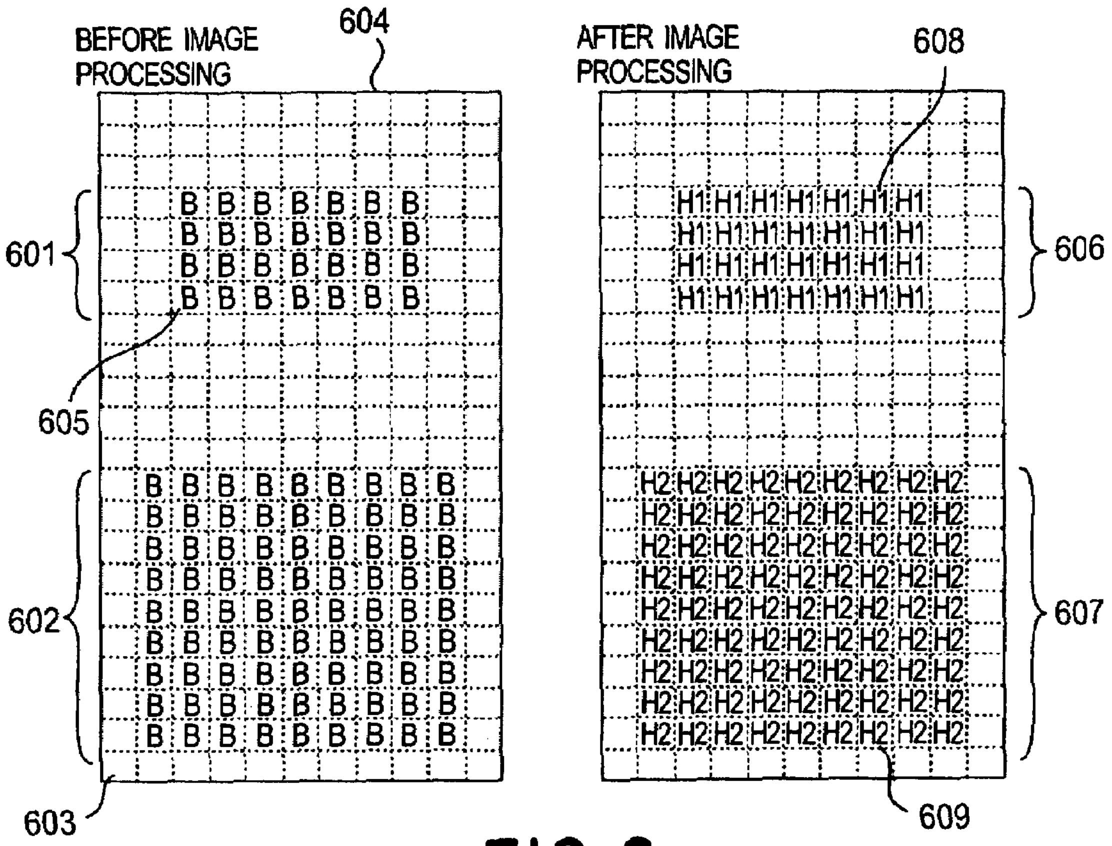
FIG. 6 is a schematic explanatory view regarding image information in Embodiment 1.

FIGS. 6(*a*) and 6(*b*) are views for illustrating the effect of image processing in the case of reducing the amount of toner consumption.

In FIG. 6(*a*), there are a small area image 601, having a relatively small pixel area for development, and a large area pixel 602, having a relatively large pixel area for development. These small and large area images 601 and 602 are indicated in image information 604 as a part thereof.

Referring to FIG. 6(*a*), a cell 603 shows one pixel and corresponds to 1/600 inch in the case of a resolution of 600 dpi. A pixel 605 indicated by "B" is a pixel on which a dot is printed by development, and a blank pixel (which is not indicated by "B") is a pixel on which a dot is not printed.

With respect to the concentrated pixel area 601, which is determined as the small area image in the image processing CPU 103, image processing is performed according to the image processing pattern (504 of FIG. 5) for the small area image. Further, with respect to the concentrated image area 602, which is determined as the large area image, image processing is performed according to the image processing pattern (505 of FIG. 5) for the large area image.

In this embodiment, the large area-concentrated pixel area is, e.g., a concentrated pixel area having not less than 8 dots in a main-scanning direction and not less than 8 dots in a sub-scanning direction. The small area-concentrated pixel area is, e.g., a concentrated pixel area having not more than 7 dots in the main-scanning direction and not more than 7 dots in the sub-scanning direction. The determination as to the large/small area-concentrated pixel areas is not limited to the above manner but can be appropriately modified.

In image information after the image processing shown in FIG. 6-*b*, the pixels processed as the small area image 606 are processed as a halftone gradation data (halftone) H1 (608), which does not largely lower the density. Further, the pixels processed as the large area image 607 are processed as a halftone gradation data (halftone) H2 (609), which reduces the toner consumption amount as low as possible while retaining the density. The image processing condition of the halftone H2 for processing the large area image is set so that a degree of lowering in density by the image processing condition is larger than that by the image processing condition of the halftone H1.

Figure 7:
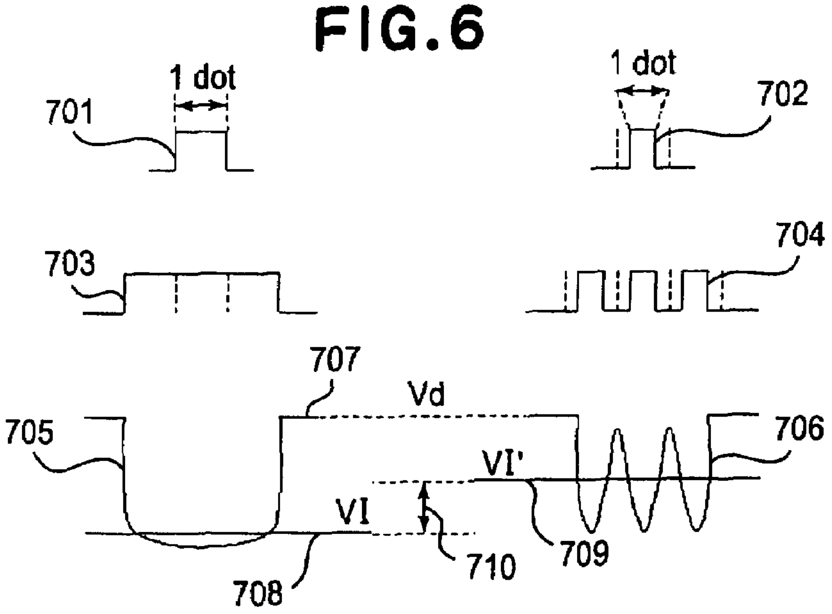
FIG. 7 is a schematic explanatory view regarding an electric potential on an image bearing member used in Embodiment 1.

With reference to FIG. 7, a description will be provided of laser-on control that is effected on the basis of the formation of a halftone image by analysis of binary data used in this embodiment.

In this embodiment, the modulation degree of a laser-on period is controlled to generate a potential difference at an exposure portion on the image bearing member on the basis of the emission time.

In FIG. 7, the modulation degree 701 having a laser-on period necessary to form one dot depending on the resolution of the printer is shown. A solid black image is formed by causing emission 703 to occur for a succession of one dot-forming periods. At this time, the potential 705 on the image bearing member becomes an exposed light-part potential V1708 relative to a dark-part potential Vd 707 of the image bearing member.

The laser emission time per one pixel, which is necessary to form one pixel, is referred to as the "reference emission time" 701.

In the case where a modulation degree of the laser-on period is controlled to be 50% of the reference emission time 701, the resultant modulation degree 702 of the laser-on period for creating one dot is as shown in the upper-light portion of FIG. 7. A solid black image is formed by continuous emission 704 according to the modulation degree 702 in which the laser-on period is controlled to be 50% of the reference emission time. As a result, a potential 706 on the image bearing member has a light-part potential Vl' 709 at an exposed portion relative to the surface potential Vd 707 of the image bearing member. Accordingly, a latent image potential on the image bearing member is changed to provide a difference 710 between the exposure potentials Vl and Vl', thus changing the amount of toner consumption. The difference between the exposure potential Vl and a DC component of a developing bias voltage is referred to as a developing contrast. Further, the difference between the dark-part potential Vd and the DC component of a developing bias voltage is referred to as a back contrast.

FIG. 8(*a*) shows the relationship between the modulation degree of a laser-on period (laser emission time) and the exposure potential (light-part potential) Vl on the image bearing member. The abscissa represents the degree (proportion) (%) of the modulation degree of a laser-on period per the reference emission time. As shown in FIG. 8(*a*), when the modulation degree of a laser-on period is 100% to 60% per the reference emission period, a change in the exposure potential Vl on the image bearing member is small. Further, also in the case of not more than 60% per the reference emission period, the change is small but is gradually increased with a decrease of the modulation degree.

FIG. 8(*b*) shows the relationship between the exposure potential Vl on the image bearing member and a solid black (image) density. As shown in FIG. 8(*b*), the solid black density is changed non-linearly with respect to the exposure potential. Particularly, as the exposure potential Vl becomes small (large in terms of an absolute value), the solid black density is abruptly decreased. Further, a satisfactory value of the solid black density is generally not less than 1.4, so that a necessary exposure potential on the image bearing member at this time is found to be not less than −200 V. Accordingly, the modulation degree of the laser-on period can be reduced to about 60% per the reference emission time as understood from FIG. 8(*a*).

FIG. 8(*c*) shows the relationship between the exposure potential Vl on the image bearing member and a line (image) width. The line width in this case is determined by measuring a drawn line having a 4 dot-width (about 170 μm) at a resolution of 600 dpi with a microscope. As shown in FIG. 8(*c*), it is found that the line width is moderately changed relative to the exposure potential, i.e., gradually decreased with the decrease in exposure potential V1 similarly as in the case of the solid black density. Further, with respect to the 4 dot-line width (170 μm), a necessary line width for providing a satisfactory image quality is about 160 μm. For this reason, in order to obtain a line width of not less than 160 μm, it is found that the exposure potential on the image bearing member is required to be not less than −180 V. Accordingly, as understood from FIG. 8(*a*), the modulation degree of the laser-on period can be reduced to about 80% per the reference emission time.

As shown in the graphs (FIGS. 8(*a*) to 8(*c*)), the solid black density and the line width affect the exposure potential on the image bearing member. Particularly, the exposure potential is changed largely with respect to the solid black image. Further, it is formed that the exposure potentials for the respective images (solid black image and line image) for maintaining satisfactory image qualities are different from each other.

FIG. 9 shows image data subjected to confirmation of the progression of the solid black density and the line width. As shown in FIG. 9, the image data include, at a central portion on, e.g., a A4-size recording sheet, a 5 cm-square solid black image 901 for measuring the solid black density and adjacent vertical and horizontal lines 802, each having a length of 5 cm (1180 dots) and a 4 dot-width, for measuring the line width. The solid black (image) density is measured by using a reflection density measuring apparatus ("RD 918", mfd. by Macbeth Corp.) with respect to the square solid black image. Further, the line width is determined by measuring respective line widths of the vertical and horizontal lines through a microscope and obtaining an average of these widths.

In this embodiment, an experiment is made on changes in solid black density and line width depending on the number of fed sheets under conditions such that the modulation degree of the laser-on period for the large area image such as the solid black image 901 is set to 60% and that for the small area image, such as the line image 901, is set to 80%, on the basis of the predetermined modulation degree of the laser-on period for one dot (the reference emission time).

In this experiment, the process speed is set to 200 mm/sec and 30 recording sheets (A4-size) can be continuously fed in its longitudinal direction. As the charging bias voltage application condition, a bias voltage of a DC voltage of −600 V biased (superposed) with an AC voltage of 2400 Hz is used for charging the image bearing member surface to a charge potential of −600 V. Similarly, as the developing bias voltage application condition, a bias voltage of a DC voltage of −450 V biased with an AC voltage of 2400 Hz is used. In order to provide an exposure potential of −150 V on the image bearing member, the laser light quantity is set to 2.4 mJ/$m^2$.

The developing contrast as a difference between the DC component of the developing bias voltage and the exposure potential on the image bearing member is determined to have an appropriate value so that the toner has a sufficient density at the exposure portion on the image bearing member. The back contrast as a difference between the DC component of the developing bias voltage and the charge potential of the image bearing member is adjusted to an appropriate value in order to prevent such a phenomenon (developer fog) that the developer is developed at a non-image portion to cause jumping of toner to an original white portion.

The toner cartridge contains 1000 g of toner and permits the feeding of 16000 sheets at an amount of toner consumption of 60 mg per one sheet. A resolution is 600 dpi and a modulation degree of the laser-on period for one dot as a basis for creating one dot is 63 nsec in this case. The A4-size recording sheets are fed in an intermittent sheet feeding mode in which the drive of the image forming apparatus is stopped for every one sheet printing. Further, image formation is performed in a low toner consumption mode using an image processing method (image analysis) in which means for discriminating a distribution of image signals for image processing condition discriminates concentrated pixel areas, so that an area having a size of not more than 10 dots×10 dots is determined to be a small area and an area having a size of not less than 11 dots×11 dots is determined to be a large area.

The measurements of the solid black density and the line width are performed by using the image sample shown in FIG. 9, and the sampling is effected every 2000 sheets. Further, in this experiment, the print ratio is decreased so as to provide the number of fed sheets 1.5 times that in the case of ordinary use since the modulation degree of the laser-on period per the reference emission time is set to 60% for the large area and 80% for the small area for the purpose of examining the progression of the solid lack density and the line image in the case of employing the low consumption mode.

As a result, as shown in FIG. 10(*a*) for the progression of solid black density and FIG. 10(*b*) for the progression of line width, both of the solid lack density and the line width are found to be decreased with an increasing number of fed sheets. Accordingly, by using the toner cartridge after completion of the continuous printing, the modulation degree of the laser-on period and the exposure potential are measured. As a result, as shown in FIG. 11, compared with the progression at an initial stage of sheet feeding indicated by a dotted line, the progression after completion of sheet feeding indicated by a solid line shows that the exposure potential on the image bearing member is increased after completion of sheet feeding. Further, it is found that the exposure potential is not substantially changed before and after the sheet feeding in the case where the modulation degree of the laser-on period is 100% but is largely changed at the modulation degree in the vicinity of 60%.

Further, when the progression of the number of fed sheets and the exposure potential on the image bearing member is examined with respect to the solid black image considerably deteriorated in particularly image quality, as shown in FIG. 12, the exposure potential is found to be substantially linearly changed with the number of fed sheets. In other words, it shows that an exposure characteristic of the image bearing member for the toner cartridge is changed by the sheet feeding test.

This change in exposure characteristic of the image bearing member is known as being attributable to a change in thickness of the photosensitive layer. Further, since the thickness change of the photosensitive layer is changed depending on the number of fed sheets, the exposure potential on the image bearing member is also found to be changed depending on the number of fed sheets. In addition, the progression of the solid black density at a modulation degree of the laser-on period, which is considerably deteriorated as shown in FIG. 8(*a*), of 60% per the reference emission time is largely changed as the exposure potential on the image bearing member is decreased. Accordingly, the above described changes are problems peculiar to the case of employing the low consumption mode using the image processing method. The toner consumption amount is changed by decreasing the modulation degree of the laser-on period other than the low consumption mode, so that the change in exposure potential on the image bearing member, i.e., the density change of the solid black image, or the change in line width are at a level to cause substantially no problem.

The thickness change of the photosensitive layer is changed depending on the number of fed sheets as described above. However, the relationship between the number of fed sheets and the thickness change of the photosensitive layer is changed depending on the sheet feeding condition, such as intermittent sheet feeding or a continuous sheet feeding. This is because the change in photosensitive layer thickness principally depends on the number of application times of the charging bias voltage and the developing bias voltage. For this reason, in this experiment, sheet feeding is performed in the intermittent mode wherein the sheet feeding is stopped every one sheet. In this intermittent mode, the charging bias voltage and the developing bias voltage are applied not only in a period of sheet feeding but also during pre-rotation treatment and post-rotation treatment, thus most quickly wearing out the photosensitive layer in the sheet feeding test. For example, as shown in FIG. 13, when the exposure potentials on the image bearing member in the case of the intermittent sheet feeding having a higher wearing speed of the photosensitive member and the case of the continuous sheet feeding having a lower wearing speed are compared, it is found that the change in exposure potential with the number of fed sheets in the continuous sheet feeding is more moderate than in the case of the intermittent sheet feeding.

Accordingly, with respect to the photosensitive layer thickness change of the image bearing member, compared with the change with the number of fed sheets, it is appropriate to use the amount of usage of the image bearing member (image bearing member usage), which is the sum of the charging bias voltage application time multiplied by the wearing contribution ratio of the photosensitive layer and the image bearing member rotation time multiplied by the wearing contribution ratio of the photosensitive layer. In this embodiment, the amount of usage of the image bearing member correlated with the photosensitive layer thickness of the image bearing member is employed.

The image bearing member usage is calculated according to the following equation: $W=a\times Pt+b\times Dt$, where W represents an image bearing member usage, Pt represents a charging bias voltage application time (period), Dt represents a rotation time (period) of the image bearing member, and a and b represent the contribution ratio with respect to a thickness change of the photosensitive layer.

In this embodiment, $a=1$ and $b=0.5$. Further, Pt and Dt are shown in FIG. 14. Referring to FIG. 14, in the case of the intermittent sheet feeding, the application time (or the rotation time) is the sum of the time of pre-rotation, sheet feeding, and post-rotation. On the other hand, in the case of continuous sheet feeding, the application (rotation) time is the sum the time of sheet feeding and the sheet feeding interval since the pre-rotation and the post-rotation are not performed.

FIG. 15 shows the relationship between the number of fed sheets and the image bearing member usage (W) in the cases of the intermittent sheet feeding (higher wearing speed) and the continuous sheet feeding (lower wearing speed).

In this embodiment, the intermittent sheet feeding mode is employed as the sheet feeding mode.

First, let us examine the modulation degree of the laser-on period that is necessary to provide an exposure potential of −200 V on the image bearing member at which a solid black image has a density of not less than 1.4 at a predetermined image bearing member usage (W).

A measurement is made every 5000 sheets in this embodiment. As a result, the modulation degrees of the laser-on period for obtaining the image bearing member exposure potential of −200 V permitting the progression of the solid black density of 1.4 or above are shown in FIG. 16. FIG. 16 shows the modulation degrees of the laser-on period in the range of the image bearing member usage of 0 to 181200. The image bearing member usage (drum usage) is not the number of fed sheet but is the above-described image bearing member usage (W).

By switching the modulation degree of the laser-on period depending on the drum usage in accordance with the result of FIG. 16, it is possible to make the line width progression uniform, just as the solid black density is uniform.

The solid black density progression and the line width progression are examined in an actual sheet feeding test by using the modulation degrees of the laser-on period, providing the resultant solid black density of not less than 1.4, shown in FIG. 16. In this sheet feeding test, six image forming conditions 0 to 5 are set as shown in FIG. 17. More specifically, the six image forming conditions 0-5 correspond to a drum usage (image bearing member usage) of 0, 37750 (corresponding to the feeding of 5000 sheets), 75500 (corresponding to the feeding of 10000 sheets), 113250 (corresponding to the feeding of 15000 sheets), 15100 (corresponding to the feeding of 2000 sheets), and 181200 (corresponding to the feeding of 25000 sheets), respectively. The modulation degree of the laser-on period is switched at timing such that the drum usage (W) reaches the respective levels. The relationship between the image forming conditions, the drum usage levels, and the modulation degrees of the laser-on period are shown in FIG. 17.

As a result of switching of the modulation degree of the laser-on period depending on the drum usage (W), as shown in FIG. 18(*a*), the density progression in the case where the switching is not effected, is gradually changed (lowered) as indicated by a dotted line. On the other hand, in the case where the switching is effected, the density progression is stable as indicated by a solid line. Similarly, with respect to the line width as shown in FIG. 18(*b*), it is possible to ensure a stable progression by effecting the switching.

However, variations as the cartridges include not only the change in wearing speed of the photosensitive layer but also an irregularity in photosensitive characteristic of the image bearing member. Accordingly, on the basis of the photosensitive characteristic (normal sensitivity) of the image bearing member used in the above-mentioned test in which the modulation degree of the laser-on period is switched depending on the drum usage (W), the relationship between the modulation degree of the laser-on period and the exposure potential of the image bearing member is evaluated with respect to an image bearing member having a high sensitivity (referred to as a "sensitive image bearing member") and an image bearing member having a low sensitivity (referred to as an "less sensitive image bearing member").

The results are shown in FIG. 32. As shown in FIG. 32, compared with the curve indicated by a solid line for the image bearing member having a normal sensitivity, the curve indicated by a dotted line ("SENSITIVE") for the sensitive image bearing member is shifted downward. On the other hand, the curve indicated by alternate long and short dashed lines ("LESS SENSITIVE") for the less sensitive image bearing member is shifted upward.

Next, by using means for switching the modulation degree of the laser-on period depending on the drum usage (W), the solid black density progression and the line width progression are evaluated with respect to the sensitive and insensitive image bearing members under image forming conditions identical to those described above.

The results are shown in FIG. 33(*a*) for the solid black density progression and FIG. 33(*b*) for the line width progression. In these figures, the solid line represents the progressions for the sensitive image bearing member, and the dotted line represents the progressions for the less sensitive image bearing member. As shown in FIGS. 33(*a*) and 33(*b*), both of the solid black density and the line width for the sensitive image bearing member (solid line) progress at higher levels relative to a target solid black density (=1.4) and a target line width (=170 μm) but are at levels of no problem. On the other hand, those for the less sensitive image bearing member (dotted line) progress at lower levels relative to the target solid black density and line width, thus resulting in a deterioration in image quality.

Further, as shown in FIGS. 33(*a*) and 33(*b*), both the solid black density progression and the line width progression are substantially constant with respect to the drum usage (W), so that it is found that a time interval of switching of the modulation degree of the laser-on period is of no problem.

Next, in order to prevent the solid black density progression and the line width progression from being changed even in the case where the sensitivity of the image bearing member is changed, the modulation degree of the laser-on period depending on the drum usage is examined.

The results are shown in FIG. 34(*a*) for the sensitive image bearing member and FIG. 34(*b*) for the less sensitive image bearing member. These figures show optimum modulation degrees (%) of the laser-on period relative to the reference emission time.

With respect to the sensitive image bearing member shown in FIG. 34(*a*), the values of the modulation degrees as to the drum usages (W) from 75500 to 15100 are identical to those under image processing conditions 0 to 2 for the image bearing member (having normal sensitivity) shown in FIG. 17. Further, with respect to the less sensitive image bearing member shown in FIG. 34(*b*), the values of the modulation degrees as to the drum usages (W) from 0 to 75500 are identical to those under image processing conditions 2 to 4 for the image bearing member shown in FIG. 17.

In view of these results shown in FIGS. 17, 34(*a*) and 34(*b*), it is possible to prepare a single switching table for image processing conditions including variations in sensitivity of the image bearing member as shown in FIG. 20. In FIG. 20, designation Nos. (ID Nos.) for designating the respective image processing conditions are also indicated.

In the case of using the switching table shown in FIG. 20, it is necessary to select an appropriate image processing condition on the basis of the sensitivity of the image bearing member and the drum usage.

Accordingly, in this embodiment, depending on the drum usage of the toner cartridge used, means (image analysis pattern) for discriminating an image signal distribution and the modulation degree of the laser-on period are switched, and threshold information for effecting switching and designation values each for designating a corresponding combination of an image analysis pattern and a modulation degree of the laser-on period are correlated with each other and stored in a storing device mounted to the cartridge.

The reason why the image analysis pattern is switched depending on the drum usage is as follows.

With an increase in drum usage, the image analysis pattern is switched as follows.

With an increase in drum usage, the sensitivity of the image bearing member is liable to gradually become insensitive. When the sensitivity of the image bearing member becomes insensitive, image quality deteriorates in some cases when there is a large amount of usage of the image bearing member in the case where the modulation degree of the laser-on period is changed on the basis of a determination that an identical concentrated pixel is printed over a large image area. For this reason, by switching the image analysis pattern depending on the drum usage, it is possible to effectively reduce the amount of toner consumption in some cases with no deterioration in image quality.

The storing device mounted to the cartridge will be described more specifically with reference to FIG. 28, which shows a conceptual diagram of a storing area (region) 2801 of the storing device used in this embodiment.

Referring to FIG. 28, the storing area 2801 may, e.g., be divided into an area 2802 in which process set values necessary for image formation are stored, an area 2803 for storing sheet feed history information, which increases depending on the sheet feeding operation, and an area 2804 in which unique information of the cartridge is stored.

The process set values stored in the area 2801 include those values 2805 which are switched with use and those values 2806 which are constant for some cartridges.

In the area of the process set values 2805, threshold values 2807, such as switching sheet number and the number of rotation, and switching process set values 2808 are stored.

Further, a sufficient storage area is ensured so that the area 2803 for storing data of the number of rotation of the image bearing member and the number of fed sheets, generated by the use of the cartridge, can sufficiently store a maximum of available values.

In this embodiment, in a storing area of the storing device mounted to the cartridge as shown in FIG. 21, threshold information for effecting switching of image forming conditions and designation values (information for setting image forming conditions) for image forming conditions to be switched are stored.

The threshold information for effecting switching of image forming conditions is stored in, e.g., the storing (memory) area 2802 of FIG. 28, and the corresponding designation values (ID information) for the image forming conditions are also stored in the storing area 2802 of FIG. 28.

These stored values are, e.g., shown in FIG. 35(*a*) for the sensitive image bearing member and FIG. 35(*b*) for the less sensitive image bearing member. As shown in FIGS. 35(*a*) and 35(*b*), the threshold information and the designation values are correlated with each other.

The data shown in FIG. 35(*a*) are to be stored in the storing area of the storing device of the cartridge for the sensitive image bearing member, and the data shown in FIG. 35(*b*) are to be stored in the storing area of the storing device of the cartridge for the less sensitive image bearing member.

Incidentally, a value of the drum usage (W) calculated according to the above described equation is updated and stored in the area 2803 (FIG. 28) of the storing device, and the information thereon is spread out and compared with the threshold information stored in the area 2807 of the storing device. Based on the result thereof, control may be effected at a timing such that the drum usage reaches the threshold information.

Further, as data for calculating the drum usage (W), it is possible to use the charging bias application time Pt and the drum rotation time Dt, which are updated and stored in the area 2803 of the storing device, and coefficients (contribution ratios) a and b, which are stored in the area 2804 of the storing device.

With respect to the sensitivity of the image bearing member, a sensitivity measurement is performed on every lot or every day in a production stage, so that it is possible to store information on the sensitivity of the image bearing member based on the corresponding measurement result.

A flow of control in the low toner consumption mode in this embodiment will be described with reference to FIGS. 1 and 19.

Together with a printing instruction, image information is sent from a computer or the like connected to a printer, whereby control in the printer is started (1901).

After the CPU 103 makes a determination as to whether all of the image information is received (1902), the amount of usage of the image bearing member (drum usage) is calculated (1903).

Together with the calculation of drum usage, the IO controller 105 communicates with the storing device mounted to the cartridge to read out a plurality of pieces of threshold information in the low toner consumption mode (1904).

The CPU 103 compares the calculated current drum usage with threshold information read out from the storing device (1905).

As a result of the comparison, in the case where the threshold information coincides with the drum usage, a designation value of an image processing condition stored in association with the coincident threshold information is determined (1906).

After the determination of the designation value of the image processing condition, a plurality of image processing conditions stored in the main assembly storing device disposed with the image forming apparatus main assembly are read out to determine an image processing condition corresponding to the determined designation value (1907).

By the determination of the image processing condition, an image analysis pattern and an appropriate modulation degree of the laser-on period at each pixel are determined to effect image processing (1908). The image processing is effected in corresponding with a determined concentrated pixel from a concentrated pixel having a large area (1909), a concentrated pixel having a small area (1910), and other pixels, such as blank dots (1911).

Thereafter, a determination is made as to whether there is an unprocessed image with respect to the resultant image information (1912). When completion of the image processing is confirmed (1913), image formation is effected (1914).

When image formation is effected, a signal corresponding to a selected modulation degree of the laser-on period is outputted from the CPU 103 to the laser drive controller 106 to expose the photosensitive image bearing member to laser light, thus effecting image formation (1914).

Thereafter, completion processing is performed to effect storage again with respect to an updated element, such as usage information of the image bearing member on the basis of the usage history information in the storing device.

After the storage, all the printing operations are completed (1915).

As described above, by storing switching threshold information for changing the modulation degree of the laser-on period on the basis of the amount of usage of image bearing member (drum usage) representing a usage status of the toner cartridge in association with a designation value of an appropriate image processing condition on the basis of the drum usage, it becomes possible to effect such a low toner consumption mode which can keep the change in exposure potential on the image bearing member at a constant level on the basis of the drum usage and decrease the toner consumption amount as low as possible in the sheet feeding operation to stabilize image quality.

Further, a switching table for effecting extensive laser emission time control including control of the irregularity in sensitivity of the image bearing member is stored in the storing device of the image forming apparatus main assembly, and the switching threshold information and the designation value of an appropriate image processing condition on the basis of the drum usage are stored in the storing device mounted to the cartridge, whereby it becomes possible to effect stable image output since the changes in solid black density progression and line width progression depending on the irregularity in sensitivity can be maintained at a constant level for each cartridge.

In this embodiment, 9 types of image processing conditions are prepared but it is also possible to increase or decrease the number of types of image processing conditions in order to effect appropriate control.

In this embodiment, the designation value stored in the storing device is describe as a simple numerical value to be stored but the present invention is not limited thereto.

Further, the storing devices, the laser emission time, the image processing conditions to be switched, the switching threshold values, etc., can be appropriately modified.

Further, the distribution of the image signal is discriminated by classifying the concentrated pixel into those having a small area and a large area. However, it is also possible to effect further detailed classification by performing analysis more specifically.

In this embodiment, with respect to a frame portion of the concentrated pixel, it is effective to add a sequence such that an operation for reducing the toner consumption amount is not performed.

In the present invention, conditions including the process speed, the resolution, the modulation degree of the laser-on period, the drum usage, its calculated equation, and the contribution ratio with respect to the photosensitive layer thickness used in the calculation equation, but the conditions are not limited to those employed in this embodiment.

In this embodiment, means for switching the image processing condition depending on the photosensitive characteristic of the image bearing member is described. The photosensitive characteristic is, however, not restricted to the sensitivity of the image bearing member. For example, a change in material which changes the photosensitive characteristic of the image bearing member is also included. According to this embodiment, it becomes possible to obtain a stable image even if any change in a photosensitive characteristic including the change in material is caused to occur. Further, it becomes possible to flexibly accommodate not only the change in the photosensitive characteristic, but also a change in the image bearing member having a different wearing speed by changing the threshold information stored in the modulation degree.

Embodiment 2

In Embodiment 1, on the basis of the drum usage, switching of the image processing condition is effected. Further, by storing both of the switching threshold value of the image processing condition and the designation value, for selecting an appropriate image processing condition, corresponding to the switching threshold value, appropriate image processing is performed on the basis of the drum usage to provide a low toner consumption mode which stabilizes image quality.

In this embodiment (Embodiment 2), the image processing condition is switched depending on the drum usage to switch the modulation degree of the laser-on period similarly as in Embodiment 1. Further, the threshold information for effecting the switching and one modulation degree of the laser-on period corresponding thereto, as the designation value for switching the image processing condition, are associated with each other and stored in the storing device. On the basis of the modulation degree of the laser-on period selected in correspondence with the threshold value, a comparison with a modulation degree of the laser-on period of the image processing condition stored in the main assembly storing device is made, so that the image processing condition having the same modulation degree of the laser-on period is selected to complete the switching into the selected image processing condition.

In the following explanation in this embodiment, repetitive explanation as to the description made in Embodiment 1 is omitted. Further, effects of this embodiment are identical to those attained in Embodiment 1, so that a detailed description thereof is also omitted. In Embodiment 1, the image bearing members having different photosensitive characteristics are described but in this embodiment, only the image bearing member having a normal sensitivity (photosensitive characteristic) is used for explanation.

Similarly as in Embodiment 1, the modulation degree of the laser-on period in this embodiment refers to the proportion to the laser emission time per one dot. Further, as described in Embodiment 1, means (image analysis pattern) for discriminating a size (distribution) of a concentrated pixel area of image information refers to means for detecting the degree of concentration of pixels, such as an area having a size of 11 dots×11 dots. Further, the image processing condition refers to a condition for changing the modulation degree of the laser-on period depending on the degree of concentration of pixels determined on the basis of the image analysis pattern.

A storing method for storing information in the storing device mounted to the cartridge main assembly in this embodiment will be described with reference to FIG. 22.

In FIG. 22, in a storing area for storing threshold information in the storing device, threshold information 2201 corresponding to the drum usage in stored. Further, a modulation degree of the laser-on period 2202 is similarly stored in a storing area different from the storing area for storing the threshold information in the storing device. In this embodiment, switching is effected five times similarly as in Embodiment 1, so that 5 pieces of threshold information and five pieces of information on the modulation degree of the laser-on period are stored. Further, in this embodiment, the modulation degree information of the laser-on period to be stored is information on a modulation degree used in the case where the concentrated pixel area is larger than the predetermined-size concentrated pixel area.

A process for determining an image processing condition through the main assembly storing device in the image forming apparatus and the cartridge storing device will be described with reference to FIG. 23.

In FIG. 23, a plurality of image processing conditions 2302 (e.g., five image processing conditions 1 to 5) are stored in a main assembly storing device 2301 in the image forming apparatus so as to permit optimum image formation on the basis of the drum usage.

In the main assembly storing device 2301, the image processing conditions 2302 comprise image analysis patterns 2303 (patterns 1 to 5) for controlling the laser-on period for each pixel corresponding to a proportion of each pixel (the size of concentrated pixel area), the modulation degrees of the laser-on period 2304 (MD a to e) in the case where the concentrated pixel area is determined as a large area pixel, and modulation degrees of the laser-on period 2305 (MD) in the case where the concentrated pixel area is determined as a small area pixel.

The modulation degrees of the laser-on periods MDa to MDe (for the large area pixel) are different from each other. Other modulation degrees of the laser-on periods other than those for the large area pixel may be the same or different depending on the respective image processing conditions.

In a storing device 2307 mounted to the cartridge, values of drum usage as threshold information 2308 (TH1 to 5) for effecting switching and modulation degrees of the laser-on period 2309 (MD1 to 5), which are optimum values for large area pixels corresponding to the respective threshold values, are stored.

In the case where a printing operation is performed and the drum usage is changed and reaches the threshold value stored in the cartridge storing device, modulation degree information as a designation value stored in association with the threshold value is read out by a CPU 2310 in the image forming apparatus main assembly (2311).

For example, when the drum usage reaches the threshold value 3 (TH3), the modulation degree 3 is a modulation degree of the laser-on period in the case where the concentrated pixel area is determined as the large area pixel.

By using the modulation degree 3, the CPU 2310 in the image forming apparatus communicates with the main assembly storing device 2311 (2312), and compares it with the modulation degrees of the laser-on period for the large area pixels in the image processing conditions of the main assembly storing device, thus retrieving a coincident modulation degree.

For example, assuming that the modulation degree d of the modulation degrees a to e coincides with the modulation degree 3, the image analysis pattern 4 is determined as the image processing condition including the modulation degree d.

The image formation is effected in accordance with the determined image processing condition.

A specific embodiment thereof will be described with reference to FIG. 36.

In a cartridge storing device 3601, threshold information 3602 is read out and obtained. When a drum usage of the image forming apparatus is determined as a value of not less than 37750 and less than 75500, a corresponding modulation degree of the laser-on period 80 (3603) is obtained as the designation value stored in the cartridge storing device. The resultant modulation degree 80 is compared with the modulation degrees of the laser-on period 3605 for the large area pixels stored in the main assembly storing device 3604, whereby a coincident modulation degree is retrieved. When the coincident modulation degree is determined, the image analysis pattern 2 including the coincident modulation degree, the modulation degree 80 for the large area pixel, and the modulation degree 60 for the small area pixel are selected and on the basis thereof, image processing is performed.

The read-out operation from the storing device in the control shown in FIG. 36 is performed by the IO controller 104 shown in FIG. 1, and the comparison is effected by the CPU 103 (or the CPU 2310 shown in FIG. 23). Further, the image processing is performed by the image processing controller 105.

A flow of control in the low toner consumption mode in this embodiment will be described with reference to FIGS. 1 and 24.

Together with a printing instruction, image information is sent from a computer or the like connected to a printer, whereby control in the printer is started (2401).

After the CPU 103 makes a determination as to whether all the image information is received (2402), the amount of usage of the image bearing member (drum usage) is calculated (2403).

Together with the calculation of drum usage, the IO controller 105 communicates with the storing device mounted to the cartridge to read out a plurality of pieces of threshold information in the low toner consumption mode (2404).

The CPU 103 compares the calculated current drum usage with threshold information read out from the storing device (2405).

As a result of the comparison, in the case where the threshold information coincides with the drum usage, the modulation degree of the laser-on period 2406 for the large area pixel, as a designation value stored in association with the coincident threshold information is determined (2407).

After the determination of the modulation degree of the laser-on period, the CPU 103 compares the modulation degree of the laser-on period for the large area pixel of a plurality of image processing conditions stored in the main assembly storing device disposed with the image forming apparatus main assembly with the modulation degree of the laser-on period obtained from the storing device to determine an image processing condition having a coincident modulation degree of the laser-on period (2408).

By the determination of the image processing condition, an image analysis pattern and an appropriate modulation degree of the laser-on period at each pixel are determined to effect image processing by the image processing controller 105 (2409). The image processing is effected (2413) in corresponding with a determined concentrated pixel from a concentrated pixel having a large area (2410), a concentrated pixel having a small area (2411), and other pixels, such as blank dots (2412).

Thereafter, a determination is made as to whether there is an unprocessed image with respect to the resultant image information (2414). When completion of the image processing is confirmed (2415), image formation is effected (2416).

When image formation is effected, exposure of the photosensitive image bearing member to laser light is effected at the modulation degree of the laser-on period corresponding to the selected modulation degree of the laser-on period to effect image formation.

Thereafter, completion processing is performed to effect storage again with respect to an updated element such as usage information of the image bearing member on the basis of the usage history information in the storing device.

After the storage, all the printing operations are completed (2417).

As described above, by storing switching threshold information for changing the modulation degree of the laser-on period on the basis of the amount of usage of image bearing member (drum usage) representing the usage status of the toner cartridge in association with the modulation degree of the laser-on period as a designation value of an image processing condition on the basis of the drum usage, it becomes possible to effect such a low toner consumption mode which can keep the change in exposure potential on the image bearing member at a constant level on the basis of the drum usage and decrease the toner consumption amount as low as possible in the sheet feeding operation (on the basis of the drum usage) to stabilize image quality.

In this embodiment, 5 types of image processing conditions to be switched and 5 switching threshold values are employed, but those usable in the present invention are not limited thereto.

Further, image processing is effected by classifying the concentrated pixel into those having a small area and a large area. However, it is also possible to effect further detailed classification by performing analysis more specifically.

In this embodiment, with respect to a frame portion of the concentrated pixel, it is effective to add a sequence such that an operation for reducing the toner consumption amount is not performed.

In the present invention, conditions including the process speed, the resolution, the modulation degree of the laser-on period, the drum usage, its calculated equation, and the contribution ratio with respect to the photosensitive layer thickness used in the calculation equation, but the conditions are not limited to those employed in this embodiment.

In this embodiment, the modulation degree of the laser-on period for the large area pixel is used but it may also be for the small area pixel. In such a case, a similar effect can also be attained.

In addition, the change in the image analysis pattern depending on the drum usage (as in Embodiment 1) is effective means in this embodiment.

Further, similar as in Embodiment 1, it is also possible to effect such a control that the calculated drum usage and information thereon are stored in the storing device mounted to the cartridge and are read out together with the threshold information, as shown in FIG. 28.

Embodiment 3

In this embodiment, the modulation degree of the laser-on period is switched depending on the drum usage and, together with the threshold information for effecting the switching, a plurality of different designation values of the modulation degrees of the laser-on period, depending on a distribution of the image signal at each pixel are stored in association therewith in the storing device.

In the following explanation in this embodiment, a repetitive explanation as to the description made in Embodiment 1 is omitted. Further, effects of this embodiment are identical to those attained in Embodiment 1, so that a detailed description thereof is also omitted. In Embodiment 1, the image bearing members having different photosensitive characteristics are described but in this embodiment, only the image bearing member having a normal sensitivity (photosensitive characteristic) is used for explanation.

Similarly as in Embodiment 1, the modulation degree of the laser-on period in this embodiment refers to the proportion to the laser emission time per one dot. Further, as described in Embodiment 1, means (image analysis pattern) for discriminating the size (distribution) of a concentrated pixel area of image information refers to means for detecting the degree of concentration of pixels, such as an area having a size of 11 dots×11 dots. Further, the image processing condition refers to a condition for changing the modulation degree of the laser-on period depending on the degree of concentration of pixels determined on the basis of the image analysis pattern.

A storing method for storing information in the storing device mounted to the cartridge main assembly in this embodiment will be described with reference to FIG. 25.

In FIG. 25, in a storing area for storing threshold information in the storing device, threshold information 2501 corresponding to the drum usage in stored. Further, a modulation degree of the laser-on period 2502 is similarly stored in a storing area different from the storing area for storing the threshold information in the storing device.

In this embodiment, two types of modulation degrees of the laser-on period stored in the storing device are required. More specifically, the modulation degrees include modulation degrees 1-5 (2503) in the case where the concentrated pixel area is determined as the large area pixel and modulation degrees 1'-5' (2504) in the case where the concentrated pixel area is determined as the small area pixel. For this reason, two storing areas for storing the respective types of the modulation degrees are provided in the storing device, and the two types of the modulation degrees are stored in the corresponding storing areas, respectively.

In this embodiment, switching is effected five times similarly as in Embodiment 1, so that 5 pieces of threshold information and five pieces of information on modulation degree of the laser-on period are stored.

The low toner consumption mode in this embodiment will be described with reference to FIG. 26.

In FIG. 26, image analysis patterns used in the image processing method are stored in the image forming apparatus.

In this embodiment, means for discriminating the size of a concentrated pixel area of a set of image signals that includes an image analysis pattern for identifying the concentrated pixel area as a large area pixel and an image analysis pattern for identifying the concentrated pixel area as a small area pixel, is used.

In a storing device 2601 mounted to the cartridge, data on drum usage to be switched is stored as threshold information 2602 for effecting switching. Further, in the storing device 2601, two types of modulation degrees of the laser-on period, corresponding to threshold values, including modulation degrees 2603 for the large area pixel and modulation degrees 2604 for the small area pixel, are stored.

In the case where a printing operation is performed and the drum usage is changed and reaches the threshold value stored in the cartridge storing device, modulation degree information as a designation value stored in association with the threshold value is read out by a CPU 2606 in the image forming apparatus main assembly.

On the basis of the modulation degree obtained from the cartridge storing device, image formation is effected by using the means 2608 for discriminating the size (distribution) of concentrated pixel area of image information stored in a storing device 2607 of the apparatus main assembly and the plurality of modulation degrees of the laser-on period stored in the storing device.

A specific embodiment thereof will be described with reference to FIG. 37.

In a cartridge storing device 3701, threshold information 3702 is stored and information thereon is read out. When the drum usage of the image forming apparatus is determined as a value of not less than 37750 and less than 75500 by the CPU, the modulation degree of the laser-on period 80 (3703) for the large area pixel and the modulation degree of the laser-on period 60 for the small area pixel are obtained. By using the resultant modulation degrees of the laser-on period, an image analysis pattern 3705 for the large area pixel, and an image analysis pattern 3706 for the small area pixel, image processing is performed.

The read-out operation from the storing device in the control shown in FIG. 37 is performed by the IO controller 104 shown in FIG. 1, and the comparison is effected by the CPU 103 (or the CPU 2606 shown in FIG. 26). Further, the image processing is performed by the image processing controller 105.

The flow of control in the low toner consumption mode in this embodiment will be described with reference to FIGS. 1 and 27.

Together with a printing instruction, image information is sent from a computer or the like connected to a printer, whereby control in the printer is started (2701).

After the CPU 103 makes a determination as to whether all the image information is received (2702), the amount of usage of the image bearing member (drum usage) is calculated (2703).

Together with the calculation of drum usage, the IO controller 105 communicates with the storing device mounted to the cartridge to read out a plurality of pieces of threshold information in the low toner consumption mode (2704).

The CPU 103 compares the calculated current drum usage with threshold information read out from the storing device (2405).

As a result of the comparison, in the case where the threshold information coincides with the drum usage, a plurality of modulation degrees of the laser-on period stored in association with the coincident threshold information are read out by the IO controller 104 (2706).

With respect to the modulation degrees of the laser-on period, the modulation degree of the laser-on period for other large area pixels and the modulation degree of the laser-on period for the small area pixel area are read out depending on the threshold information. After the modulation degree information is obtained, an image processing condition is determined together with an image analysis pattern to be stored in the image forming apparatus main assembly (2708).

By the determination of the image processing condition, an image analysis pattern and an appropriate modulation degree of the laser-on period at each pixel are determined to effect image processing by the image processing controller 105 (2709). The image processing is effected (2713) in corresponding with a determined concentrated pixel from a concentrated pixel having a large area (2710), a concentrated pixel having a small area (2711), and other pixels, such as blank dots (2712).

Thereafter, a determination is made as to whether there is an unprocessed image with respect to the resultant image information (2714). When completion of the image processing is confirmed (2715), image formation is effected (2716).

When image formation is effected, exposure of the photosensitive image bearing member to laser light is effected at the modulation degree of the laser-on period corresponding to the selected modulation degree of the laser-on period to effect image formation (2716).

Thereafter, completion processing is performed to effect storage again with respect to an updated element such as usage information of the image bearing member on the basis of the usage history information in the storing device.

After the storage, all the printing operations are completed (2717).

As described above, by storing switching threshold information for changing the modulation degree of the laser-on period on the basis of the amount of usage of image bearing member (drum usage) representing a usage status of the toner cartridge in association with the plurality of modulation degrees of the laser-on period, it becomes possible to effect such a low toner consumption mode which can keep the change in exposure potential on the image bearing member at a constant level on the basis of the drum usage and decrease the toner consumption amount as low as possible in sheet feeding operation to stabilize image quality.

Further, in the case where the photosensitive characteristic is different from the assumed degrees thereof as in Embodiment 1, in some cases, the modulation degree of the laser-on period can only be changed in the range therefor stored in the storing device of the apparatus main assembly. However, as described in this embodiment, it becomes possible to obtain a stable image irrespective of the photosensitive characteristic of the image bearing member by storing individual modulation degrees of the laser-on period.

In this embodiment, 5 types of image processing conditions to be switched and 5 switching threshold values are employed but those usable in the present invention are not limited thereto.

Further, the image processing is effected by classifying the concentrated pixel into those having a small area and a large area. However, it is also possible to effect a further detailed classification by performing analysis more specifically.

In this embodiment, with respect to a frame portion of the concentrated pixel, it is effective to add a sequence such that an operation for reducing the toner consumption amount is not performed.

In this embodiment, means for directly storing the modulation degree of the laser-on period as a designation value to be stored together with the threshold information in the cartridge storing device is used, but means usable in the present invention is not limited thereto.

In the present invention, conditions including the process speed, the resolution, the modulation degree of the laser-on period, the drum usage, its calculated equation, and the contribution ratio with respect to the photosensitive layer thickness used in the calculation equation, are not limited to those employed in this embodiment.

Further, in this embodiment, all the modulation degrees of the laser-on period used in the image processing method are stored in the storing device. However, as described in Embodiment 2, e.g., information on the modulation degrees of the laser-on period stored in the storing device includes the modulation degree of the laser-on period for the large area pixel and the modulation degree of the laser-on period for the small area pixel, and modulation degrees for other pixels are stored in association with the modulation degree for the small area pixel in the main assembly storing device of the image forming apparatus. Thus, such a manner that the modulation degree for other pixels are determined from the modulation degree for the small area pixel is effective for obtaining a similar effect.

In addition, in this embodiment, the use of a single image analysis pattern of image processing condition is described, but it is also possible to effect switching of a plurality of image analysis patterns by storing those in the main assembly storing device in association with the modulation degree for the large area pixel.

Further, similar to Embodiment 1, it is also possible to effect such control that the calculated drum usage and information thereon are stored in the storing device mounted to the cartridge and are read out together with the threshold information, as shown in FIG. 28.

Embodiment 4

In this embodiment, the modulation degree of the laser-on period is switched depending on the drum usage and, together with the threshold information for effecting the switching, designation values for designating image analysis patterns for determining a plurality of different modulation degrees of the laser-on period depending on a distribution of image signal at each pixel, and designation values for designating the modulation degrees of the laser-on period are stored in association therewith in the storing device.

In the following explanation in this embodiment, repetitive explanation as to the description made in Embodiment 1 is omitted. Further, effects of this embodiment are identical to those attained in Embodiment 1, so that a detailed description thereof is also omitted. In Embodiment 1, the image bearing members having different photosensitive characteristics are described, but in this embodiment, only the image bearing member having a normal sensitivity (photosensitive characteristic) is used for explanation.

Similarly as in Embodiment 1, the modulation degree of the laser-on period in this embodiment refers to the proportion to the laser emission time per one dot. Further, as described in Embodiment 1, means (image analysis pattern) for discriminating the size (distribution) of a concentrated pixel area of image information refers to means for detecting the degree of concentration of pixels, such as an area having a size of 11 dots×11 dots. Further, the image processing condition refers to a condition for changing the modulation degree of the laser-on period depending on the degree of concentration of pixels determined on the basis of the image analysis pattern.

A storing method for storing information in the storing device mounted to the cartridge main assembly in this embodiment will be described with reference to FIG. 29.

In FIG. 29, in a storing area for storing threshold information in the storing device, threshold information 2901 corresponding to the drum usage in stored. Further, the modulation degree of the laser-on period 2902 is similarly stored in a storing area different from the storing area for storing the threshold information in the storing device.

However, in this embodiment, a description will be provided in such a manner that the modulation degree of the laser-on period is directly stored as a designation value thereof.

In this embodiment, the modulation degree of the laser-on period stored in the storing device is a modulation degree in the case where the concentrated pixel area is determined as the large area pixel.

In this embodiment, switching is effected five times similarly as in Embodiment 1, so that 5 pieces of threshold information and five pieces of information on modulation degree of the laser-on period are stored.

A process for determining an image processing condition through the main assembly storing device in the image forming apparatus and the cartridge storing device will be described with reference to FIG. 30.

In FIG. 30, a plurality of different image analysis patterns used in the image processing method are stored in a main assembly storing device 3001 in the image forming apparatus. For the respective image analysis patterns, corresponding ID values 3003 for identifying the image analysis patterns are allotted. Further, the image analysis patterns stored in the storing device include a set of two types of image analysis patterns including an image analysis pattern 3004 for identifying the concentrated pixel area as a large area pixel and an image analysis pattern 3005 for identifying the concentrated pixel area as a small area pixel.

Further, independent from these image analysis patterns, two types of modulation degrees of the laser-on period including modulation degrees of the laser-on period 3006 for the large area pixel and modulation degrees of the laser-on period 3007 for the small area pixel are stored in association with each other.

In a storing device 3009 mounted to the cartridge, the drum usage to be switched is stored as threshold information 3010 for effecting switching. Further, in the storing device 3009, designation values 3011 and modulation degrees of the laser-on period 3012, corresponding to threshold values, are stored.

In the case where a printing operation is performed and the drum usage is changed and reaches the threshold value stored in the cartridge storing device, the designation value 3011 of the image analysis pattern and the modulation degree of the laser-on period stored in association with the threshold value are obtained.

Depending on the designation value of the image analysis pattern read out from the cartridge storing device, in the main assembly storing device in the image forming apparatus, optimum image analysis patterns for the drum usage including an image analysis pattern for the large area pixel and an image analysis pattern for the small area pixel are determined.

Further, depending on the modulation degree of the laser-on period obtained from the cartridge storing device, a comparison is made between the modulation degree of the laser-on period read out from the cartridge storing device and the modulation degree of the laser-on period for the large area pixel in the main assembly storing device. When these modulation degrees coincide with each other, the associated modulation degree of the laser-on period for the small area pixel is determined By using the resultant modulation degree of the laser-on period and the resultant image analysis pattern, image formation is effected.

A specific embodiment thereof will be described with reference to FIG. 38.

In the cartridge storing device 3801, threshold information is read. When a drum usage of the image forming apparatus is determined as a value of not less than 37750 and less than 75500, an identification value 2 (3803) for designating a corresponding image analysis pattern is obtained. At the same time, a corresponding modulation degree of the laser-on period 80 for the large area pixel is obtained (3804). Further, from an image analysis pattern table 3806 of a main assembly storing device 3805, information of not less than 13 dots×13 dots as the image analysis pattern for the large area pixel is obtained on the basis of the resultant identification value (3809). Similarly, as the image analysis pattern for the small area pixel, information of less than 13 dots×13 dots is obtained. Further, by comparing the modulation degree of the laser-on period for the large area pixel with the laser-on period 3810 in a modulation degree table 3809, the modulation degree of the laser-on period 3811 for the small area pixel associated with the coincident modulation degree of the laser-on period is obtained. In this case, a modulation degree of the laser-on period 60 is obtained for the small area pixel.

By using the above obtained image analysis pattern and modulation degrees of the laser-on period, image processing is performed.

The read-out operation from the storing device in the control shown in FIG. 38 is performed by the IO controller 104 shown in FIG. 1, and the comparison is effected by the CPU 103 (or the CPU 2606 shown in FIG. 26). Further, the image processing is performed by the image processing controller 105.

The flow of control in the low toner consumption mode in this embodiment will be described with reference to FIGS. 1 and 31.

Together with a printing instruction, image information is sent from a computer or the like connected to a printer, whereby control in the printer is started (3101).

After the CPU 103 makes a determination as to whether all the image information is received (3102), the amount of usage of the image bearing member (drum usage) is calculated (3103).

Together with the calculation of drum usage, the IO controller 105 communicates with the storing device mounted to the cartridge to read out a plurality of pieces of threshold information in the low toner consumption mode (3104).

The calculated current drum usage and the threshold information read out from the storing device are compared with each other (3105).

As a result of the comparison, in the case where the threshold information coincides with the drum usage, a designation value (3106) of the image analysis pattern and the modulation degree of the laser-on period (3107) for the large area pixel stored in association with the coincident threshold information are determined.

From the resultant designation value for the image analysis pattern, an image analysis pattern (3108) corresponding to the drum usage is obtained.

Further, from the resultant modulation degree of the laser-on period, the modulation degree of the laser-on period for the small area pixel is obtained (3109).

Therefore, the image processing is effected by the image processing controller 105 (3114) in corresponding with a determined concentrated pixel from a concentrated pixel having a large area (3111), a concentrated pixel having a small area (3112), and other pixels, such as blank dots (3113).

Thereafter, a determination is made as to whether there is an unprocessed image with respect to the resultant image information (3115). When completion of the image processing is confirmed (3116), image formation is effected (3117).

When the image formation is effected, exposure of the photosensitive image bearing member to laser light is effected at the modulation degree of the laser-on period corresponding to the selected modulation degree of the laser-on period to effect image formation (3117).

Thereafter, completion processing is performed to effect storage again with respect to an updated element such as usage information of the image bearing member on the basis of the usage history information in the storing device.

After the storage, all the printing operations are completed (3118). As described above, by storing switching threshold information for changing the modulation degree of the laser-on period on the basis of the amount of usage of image bearing member (drum usage) representing a usage status of the toner cartridge in association with the modulation degree of the laser-on period as a designation value of an image processing condition on the basis of the drum usage, it becomes possible to effect such a low toner consumption mode which can keep the change in exposure potential on the image bearing member at a constant level on the basis of the drum usage and decrease the toner consumption amount as low as possible in a sheet feeding operation (on the basis of the drum usage) to stabilize image quality.

In this embodiment, 5 types of image processing conditions to be switched and 5 switching threshold values are employed, but those usable in the present invention are not limited thereto.

Further, the image processing is effected by classifying the concentrated pixel into those having a small area and a large area. However, it is also possible to effect further detailed classification by performing analysis more specifically.

In this embodiment, with respect to a frame portion of the concentrated pixel, it is effective to add a sequence such that an operation for reducing the toner consumption amount is not performed.

In the present invention, conditions including the process speed, the resolution, the modulation degree of the laser-on period, the drum usage, its calculated equation, and the contribution ratio with respect to the photosensitive layer thickness used in the calculation equation, are not limited to those employed in this embodiment.

In this embodiment, the modulation degree of the laser-on period for the large area pixel is used but it may also be for the small area pixel or other pixels. In such a case, a similar effect can also be attained.

In addition, in this embodiment, the use of a single designation value for designating the image analysis pattern of image processing condition is described but storing of a plurality of pieces of information on, e.g., the image analysis pattern for the large area pixel and the designation value for determining the image analysis pattern for the small area pixel is further effective.

In this embodiment, the modulation degree of the laser-on period is used as a designation value stored in the storing device, but a similar effect can be attained by any information so long as it is a designation value for designating the modulation degree of the laser-on period.

Further, similar as in Embodiment 1, it is also possible to effect such control that the calculated drum usage and information thereon are stored in the storing device mounted to the cartridge and are read out together with the threshold information, as shown in FIG. 28.

The above described control methods in Embodiments 1 to 4 are directed to the low toner consumption mode, and are thus not applicable to an ordinary image formation mode.

In the present invention, other than the above-described control for reducing the change in exposure potential on the image bearing member (photosensitive drum) in the low toner consumption mode described in Embodiments 1 to 4, such a control that charging and developing conditions are switched depending on the drum usage in order to retain image qualities in the ordinary image formation mode and in the low toner consumption mode. In this case, threshold values different from those for the drum usage employed in Embodiments 1 to 4 are used for switching the charging and developing conditions.

While the invention has been described with reference to the structures disclosed herein, it is not confined to the details set forth and this application is intended to cover such modifications or changes as may come within the purposes of the improvements or the scope of the following claims.

INDUSTRIAL APPLICABILITY

As described hereinabove, according to the present invention, by changing an image forming condition depending on the amount of usage of image bearing member and information for setting a plurality of levels of the drum usage, it becomes possible to retain stable image quality to decrease the amount of usage of developer, irrespective of drum usage.

Further, by changing an image forming condition depending on the amount of usage of the image bearing member and the exposure condition of an exposure device as information for setting a plurality of levels of the drum usage, it becomes possible to retain stable image quality to decrease the amount of usage of developer, irrespective of the drum usage.

Further, by changing an image forming condition through selection of a concentrated pixel pattern for discriminating a recording image, depending on the amount of usage of the image bearing member and information for setting a plurality of levels of the drum usage, it becomes possible to retain stable image quality to decrease the amount of usage of developer, irrespective of the drum usage.

The invention claimed is:

1. An image forming apparatus operable in a first image formation mode for forming an image on an image bearing member by using developer under a first predetermined image forming condition and a second image formation mode for forming an image on an image bearing member by using developer under a second image forming condition which is different from the first predetermined image forming condition, wherein said apparatus is set so that the amount of consumption of developer for forming an image in the second image formation mode is smaller than the amount of developer used for forming an identical image in the first image formation mode, said apparatus comprising:

a storing device that stores setting information for setting the second image forming condition corresponding to a plurality of levels of an amount of usage of the image bearing member;

a controller configured to set said image forming apparatus in the first image formation mode or the second image formation mode; and an image processing controller configured to discriminate the size of a concentrated pixel area in image information when the second image formation mode is set and to perform first and second image density lowering processes on image information presenting pixel areas of different sizes, depending on the discriminated size of the pixel area, wherein in a state in which said controller is configured to set said image forming apparatus in the second image formation mode, an image density lowering process performed on the image information by said image processing controller is changed depending on the discrimination result of said image processing controller in such a manner that the first image density lowering process is performed so that image information representing pixels in pixel areas of a first size of the image to be formed has a first image density, and the second image density lowering process is performed so that image information representing pixels in pixel areas of a second size of the image to be formed has a second image density lower than the first image density, and wherein said controller sets an image forming condition for a first size of the image and a second size of the image as the second image forming condition by using the setting information, stored in said storing device, corresponding to the amount of usage of the image bearing member.

2. An apparatus according to claim 1, wherein said control means selects the concentrated pixel pattern having a predetermined size on the basis of the information for setting the second image forming condition corresponding to the plurality of levels of an amount of usage of the image bearing member.

3. An apparatus according to claim 1, wherein said storing device has a storing area for storing a plurality of levels of threshold information, wherein the threshold information and the setting information are stored corresponding to each other, and wherein when the amount of usage of the image bearing member reaches an amount of usage represented by the threshold information, said controller sets an image forming condition for the first size of the image and the second size of the image as the second image forming condition on the basis of the setting information stored corresponding to the threshold information.

4. An apparatus according to claim 3, wherein the apparatus further comprises an exposure device that exposes the image bearing member under an exposure operation condition on the basis of image information, and the information for setting the second image forming condition corresponding to the plurality of levels of the amount of usage of the image bearing member is the exposure operation condition of the exposure device.

5. An apparatus according to claim 1, wherein said image forming apparatus further comprises an exposure device that exposes the image bearing member under an exposure operation condition on the basis of image information, and wherein the second image forming condition includes the exposure operation condition.

6. An apparatus according to claim 5, wherein the exposure operation condition is an exposure time of said exposure device.

7. An apparatus according to claim 5, wherein the exposure operation condition is an exposure time of said exposure device on the basis of a sensitivity characteristic of the image bearing member.

8. An apparatus according to claim 1, wherein the setting information for setting the second image forming condition corresponding to a plurality of levels of the amount of usage of the image bearing member is designation information for determining the second image forming condition.

9. An apparatus according to claim 1, wherein the image bearing member and said storing device are integrally supported to form a cartridge which is detachably mountable to the image forming apparatus.

10. A cartridge detachably mountable to an image forming apparatus operating in a first image formation mode for forming an image on an image bearing member by using developer under a first predetermined image forming condition and a second image formation mode for forming an image on an image bearing member by using developer under a second image forming condition which is different from the first predetermined image forming condition, the apparatus being set so that the amount of consumption of developer for forming an image in the second image formation mode is smaller than the amount of developer used for forming an identical image in the first image formation mode, the image forming apparatus including a controller configured to set the image forming apparatus in the first image formation mode or the second image formation mode and an image processing controller configured to discriminate the size of a concentrated pixel area in image information when the second image formation mode is set and to perform first and second image density lowering processes on image information presenting pixel areas of different sizes, depending on the discriminated size of the pixel area, said cartridge comprising:

the image bearing member, and a storing device that stores information on the cartridge, said storing device having:

a first storing area for storing setting information for setting the second image forming condition corresponding to a plurality of levels of the amount of usage of the image bearing member in the second image formation mode; and a second storing area for storing discriminating information for discriminating the size of the concentrated pixel area in the image information, wherein the setting information and the discriminating information are stored correspondingly to each other.

11. A cartridge according to claim 10, wherein said storing means further has a second storing area for storing a plurality of level of threshold information with respect to an amount of usage of the image bearing member.

12. A cartridge according to claim 10, wherein the image forming apparatus further comprises an exposure device that exposes said image bearing member and the second image forming condition is an exposure operation condition of said the exposure means device.

13. A cartridge according to claim 12, wherein the exposure operation condition is an exposure time of the exposure device.

14. A cartridge according to claim 12, wherein the exposure operation condition is an exposure time of the exposure device on the basis of a sensitivity characteristic of said image bearing member.

15. A cartridge according to claim 10, wherein the information for setting the second image forming condition corresponding to a plurality of levels of an amount of the image bearing member is designation information for determinating the second image forming condition.

16. A cartridge according to claim 10, wherein the image forming apparatus further comprises an exposure device that exposes the image bearing member under an exposure operation condition on the basis of the image information, and the information for setting the second image forming condition corresponding to the plurality of levels of the amount of usage of said image bearing member is the exposure operation condition of the exposure device.

17. A cartridge according to claim 10, wherein said storing device has a third storing area for storing threshold information on an amount of usage of the image bearing member; and wherein the setting information and the threshold information are stored correspondingly to each other.

* * * * *